US012652669B2

(12) United States Patent
Jung et al.

(10) Patent No.: US 12,652,669 B2
(45) Date of Patent: Jun. 9, 2026

(54) MULTIPLEXING UPLINK CONTROL INFORMATION OF DIFFERENT PRIORITIES

(71) Applicant: Lenovo (Singapore) Pte. Ltd., New Tech Park (SG)

(72) Inventors: Hyejung Jung, Northbrook, IL (US); Hossein Bagheri, Urbana, IL (US); Vijay Nangia, Woodridge, IL (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 385 days.

(21) Appl. No.: 18/261,742

(22) PCT Filed: Jan. 15, 2022

(86) PCT No.: PCT/IB2022/050324
§ 371 (c)(1),
(2) Date: Jul. 17, 2023

(87) PCT Pub. No.: WO2022/153258
PCT Pub. Date: Jul. 21, 2022

(65) Prior Publication Data
US 2024/0089970 A1      Mar. 14, 2024

Related U.S. Application Data

(60) Provisional application No. 63/138,380, filed on Jan. 15, 2021.

(51) Int. Cl.
*H04W 4/00*      (2018.01)
*H04W 72/21*      (2023.01)
*H04W 72/56*      (2023.01)
(52) U.S. Cl.
CPC ........... *H04W 72/21* (2023.01); *H04W 72/56* (2023.01)

(58) Field of Classification Search
CPC .............................. H04W 72/21; H04W 72/56
See application file for complete search history.

(56) References Cited

U.S. PATENT DOCUMENTS 11,706,766 B2 * 7/2023 Yin ........................ H04L 1/1896
370/329
12,279,296 B2 * 4/2025 Lee ........................ H04L 5/0094
(Continued)

OTHER PUBLICATIONS

PCT/IB2022/050324, "Notification of Transmittal of the International Search Report and the Written Opinion of the International Searching Authority, or the Declaration", International Searching Authority, Apr. 12, 2022, pp. 1-12.

(Continued)

*Primary Examiner* — Elisabeth Benoit Magloire
(74) *Attorney, Agent, or Firm* — Kunzler Needham & Hilton; Bruce R. Needham

(57) ABSTRACT

Apparatuses, methods, and systems are disclosed for multiplexing uplink control information of different priorities. One method includes determining a first transmission of first uplink control information (UCI) on a PUCCH of a first priority, the first PUCCH being based on a first PUCCH configuration. The method includes determining a second transmission of second UCI on a second PUCCH of a second priority, the second PUCCH being based on a second PUCCH configuration. The method includes, in response to determining that the first PUCCH of the first priority overlaps in time with the second PUCCH of the second priority, multiplexing at least part of the first UCI with the second UCI on a third PUCCH of the second priority, the third PUCCH being based on the second PUCCH configuration. The second priority is higher than the first priority.

20 Claims, 6 Drawing Sheets

(56) References Cited

U.S. PATENT DOCUMENTS

| | | | | |
|---|---|---|---|---|
| 12,418,911 | B2 * | 9/2025 | Gou | H04L 1/1812 |
| 2019/0124647 | A1 * | 4/2019 | Li | H04L 1/1825 |
| 2019/0349917 | A1 * | 11/2019 | Huang | H04L 5/0053 |
| 2021/0007129 | A1 * | 1/2021 | Talarico | H04W 72/1268 |
| 2021/0212055 | A1 * | 7/2021 | Lin | H04W 72/0453 |
| 2021/0368493 | A1 * | 11/2021 | Lin | H04L 1/1861 |
| 2022/0124773 | A1 * | 4/2022 | Gao | H04L 5/0094 |
| 2022/0248396 | A1 * | 8/2022 | Zhang | H04W 72/21 |
| 2023/0224905 | A1 * | 7/2023 | Deghel | H04W 72/21 |
| | | | | 370/329 |
| 2023/0345472 | A1 * | 10/2023 | Takahashi | H04L 1/1854 |
| 2024/0057088 | A1 * | 2/2024 | Matsumura | H04W 72/1273 |

OTHER PUBLICATIONS

3GPP, "RAN1 Chairman's Notes", 3GPP TSG RAN WG1 Meeting #102-e, Aug. 17-28, 2020, pp. 1-75.
3GPP, "RAN1 Chairman's Notes", 3GPP TSG RAN WG1 Meeting #103-e, Oct. 26-Nov. 13, 2020, pp. 1-108.
Wilus Inc., "Discussion on Intra-UE multiplexing/prioritization for URLLC/IIoT", 3GPP TSG RAN WG1 #103-e R1-2009248, Oct. 26-Nov. 13, 2020, pp. 1-6.
OPPO, "Summary#1 of email thread [103-e-NR-IIOT_URLLC_enh-04]", 3GPP TSG RAN WG1 #102-e R1-2009546, Aug. 17-28, 2020, pp. 1-96.
3GPP, "3rd Generation Partnership Project; Technical Specification Group Radio Access Network; NR; Physical channels and modulation (Release 16)", 3GPP TS 38.211 V16.3.0, Sep. 2020, pp. 1-133.
3GPP, "3rd Generation Partnership Project; Technical Specification Group Radio Access Network; NR; Multiplexing and channel coding (Release 16)", 3GPP TS 38.212 V16.3.0, Sep. 2020, pp. 1-152.
3GPP, "3rd Generation Partnership Project; Technical Specification Group Radio Access Network; NR; Physical layer procedures for control (Release 16)", 3GPP TS 38.213 V16.3.0, Sep. 2020, pp. 1-179.
3GPP, "3rd Generation Partnership Project; Technical Specification Group Radio Access Network; NR; Physical layer procedures for data (Release 16)", 3GPP TS 38.214 V16.3.0, Sep. 2020, pp. 1-166.
3GPP, "3rd Generation Partnership Project; Technical Specification Group Radio Access Network; NR; Radio Resource Control (RRC) protocol specification (Release 16)", 3GPP TS 38.331 V16.2.0, Sep. 2020, pp. 1-921.

* cited by examiner

200

300

500

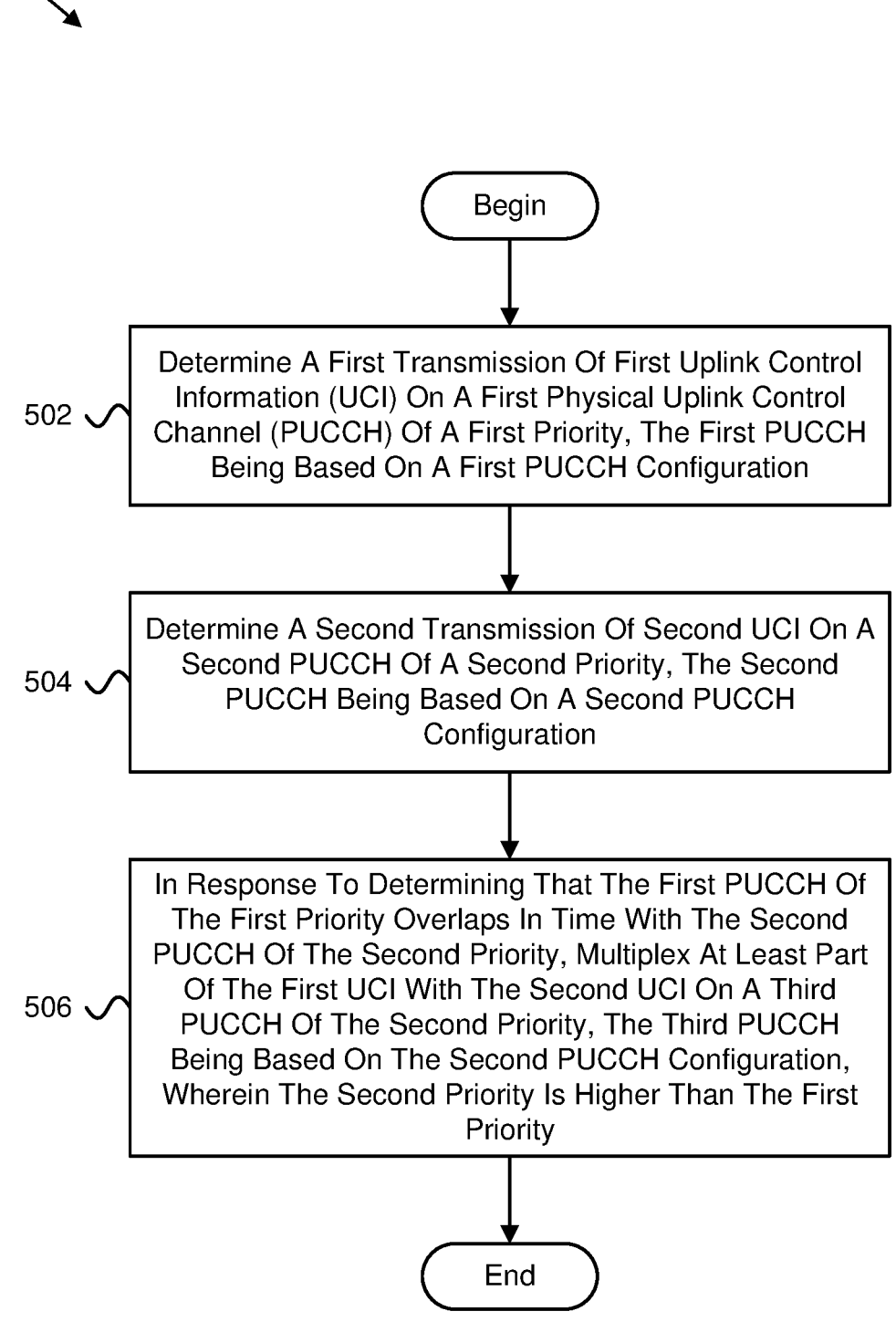

Begin

502 — Determine A First Transmission Of First Uplink Control Information (UCI) On A First Physical Uplink Control Channel (PUCCH) Of A First Priority, The First PUCCH Being Based On A First PUCCH Configuration 504 — Determine A Second Transmission Of Second UCI On A Second PUCCH Of A Second Priority, The Second PUCCH Being Based On A Second PUCCH Configuration 506 — In Response To Determining That The First PUCCH Of The First Priority Overlaps In Time With The Second PUCCH Of The Second Priority, Multiplex At Least Part Of The First UCI With The Second UCI On A Third PUCCH Of The Second Priority, The Third PUCCH Being Based On The Second PUCCH Configuration, Wherein The Second Priority Is Higher Than The First Priority End

MULTIPLEXING UPLINK CONTROL INFORMATION OF DIFFERENT PRIORITIES

CROSS-REFERENCE TO RELATED APPLICATIONS

This application claims priority to U.S. Patent Application Ser. No. 63/138,380 entitled "MULTIPLEXING UCI OF DIFFERENT PRIORITIES IN UL CHANNEL" and filed on Jan. 15, 2021 for Hyejung Jung, which is incorporated herein by reference in its entirety.

FIELD

The subject matter disclosed herein relates generally to wireless communications and more particularly relates to multiplexing uplink control information of different priorities.

BACKGROUND

In certain wireless communications networks, HARQ-ACK information may be transmitted. In such networks, the HARQ-ACK information may include high priority ("HP") and low priority ("LP") information.

BRIEF SUMMARY

Methods for multiplexing uplink control information of different priorities are disclosed. Apparatuses and systems also perform the functions of the methods. One embodiment of a method includes determining, at a user equipment, a first transmission of first uplink control information (UCI) on a first physical uplink control channel (PUCCH) of a first priority, the first PUCCH being based on a first PUCCH configuration. In some embodiments, the method includes determining a second transmission of second UCI on a second PUCCH of a second priority, the second PUCCH being based on a second PUCCH configuration. In certain embodiments, the method includes, in response to determining that the first PUCCH of the first priority overlaps in time with the second PUCCH of the second priority, multiplexing at least part of the first UCI with the second UCI on a third PUCCH of the second priority, the third PUCCH being based on the second PUCCH configuration. The second priority is higher than the first priority.

One apparatus for multiplexing uplink control information of different priorities includes a user equipment. In some embodiments, the apparatus includes a processor that: determines a first transmission of first uplink control information (UCI) on a first physical uplink control channel (PUCCH) of a first priority, the first PUCCH being based on a first PUCCH configuration; determines a second transmission of second UCI on a second PUCCH of a second priority, the second PUCCH being based on a second PUCCH configuration; and, in response to determining that the first PUCCH of the first priority overlaps in time with the second PUCCH of the second priority, multiplexes at least part of the first UCI with the second UCI on a third PUCCH of the second priority, the third PUCCH being based on the second PUCCH configuration. The second priority is higher than the first priority.

Another embodiment of a method for multiplexing uplink control information of different priorities includes scheduling, at a network device, a first transmission of first uplink control information (UCI) by a user equipment (UE) on a first physical uplink control channel (PUCCH) of a first priority, the first PUCCH being based on a first PUCCH configuration. In some embodiments, the method includes scheduling a second transmission of second UCI by the UE on a second PUCCH of a second priority, the second PUCCH being based on a second PUCCH configuration. The second PUCCH of the second priority overlaps in time with the first PUCCH of the first priority. In certain embodiments, the method includes receiving a multiplexed transmission comprising at least part of the first UCI with the second UCI on a third PUCCH of the second priority, the third PUCCH being based on the second PUCCH configuration. The second priority is higher than the first priority.

Another apparatus for multiplexing uplink control information of different priorities includes a network device. In some embodiments, the apparatus includes a processor that: schedules a first transmission of first uplink control information (UCI) by a user equipment (UE) on a first physical uplink control channel (PUCCH) of a first priority, the first PUCCH being based on a first PUCCH configuration; and schedules a second transmission of second UCI by the UE on a second PUCCH of a second priority, the second PUCCH being based on a second PUCCH configuration. The second PUCCH of the second priority overlaps in time with the first PUCCH of the first priority. In various embodiments, the apparatus includes a receiver that receives a multiplexed transmission comprising at least part of the first UCI with the second UCI on a third PUCCH of the second priority, the third PUCCH being based on the second PUCCH configuration. The second priority is higher than the first priority.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 5 is a flow chart diagram illustrating one embodiment of a method for multiplexing uplink control information of different priorities.

DETAILED DESCRIPTION

Figure 1:
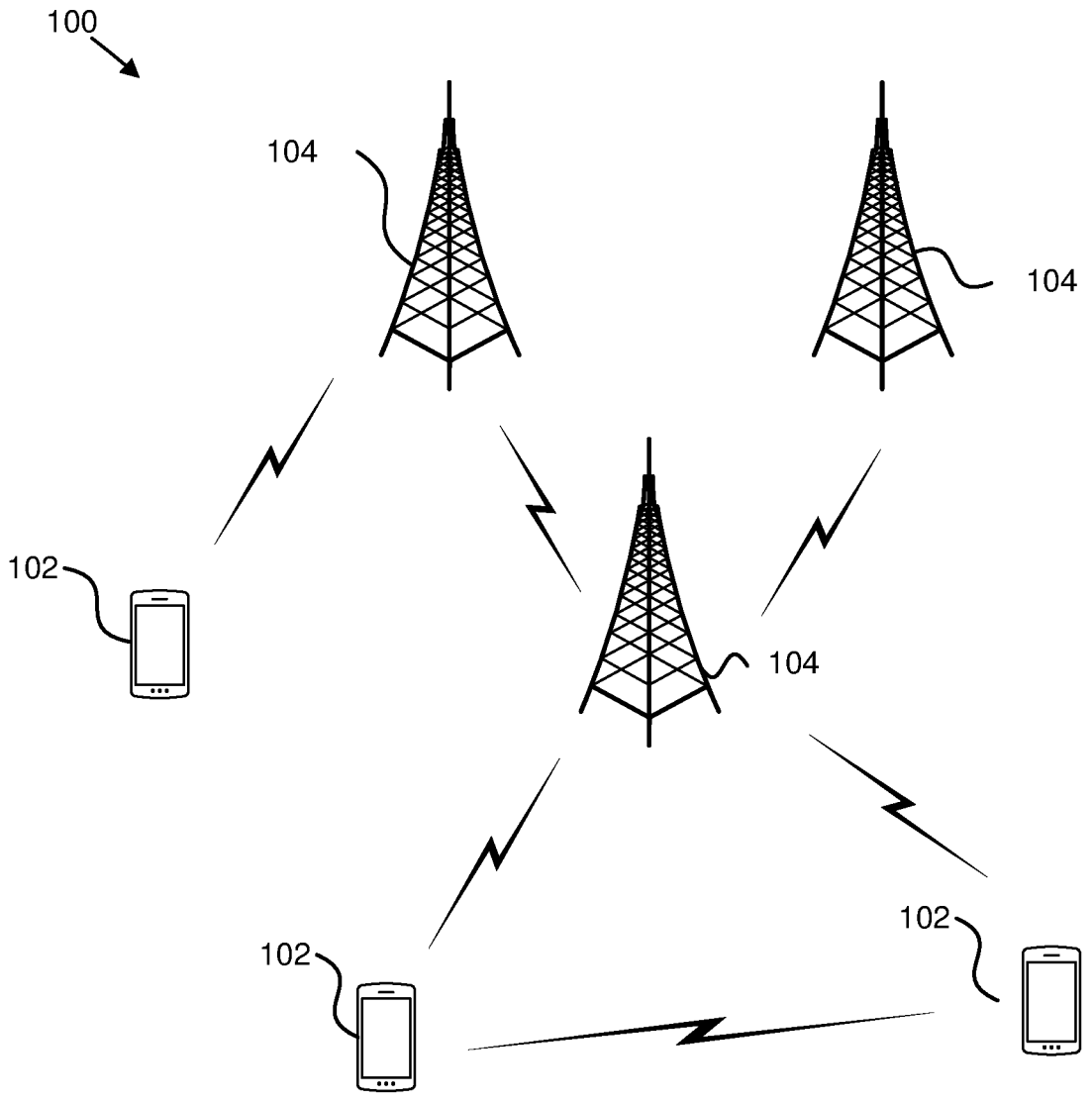
FIG. 1 is a schematic block diagram illustrating one embodiment of a wireless communication system for multiplexing uplink control information of different priorities.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/ acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100 for multiplexing uplink control information of different priorities. In one embodiment, the wireless communication system 100 includes remote units 102 and network units 104. Even though a specific number of remote units 102 and network units 104 are depicted in FIG. 1, one of skill in the art will recognize that any number of remote units 102 and network units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle onboard computers, network devices (e.g., routers, switches, modems), aerial vehicles, drones, or the like. In some embodiments, the remote units 102 include wearable devices, such as smart watches, fitness bands, optical headmounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the network units 104 via UL communication signals. In certain embodiments, the remote units 102 may communicate directly with other remote units 102 via sidelink communication.

The network units 104 may be distributed over a geographic region. In certain embodiments, a network unit 104 may also be referred to and/or may include one or more of an access point, an access terminal, a base, a base station, a location server, a core network ("CN"), a radio network entity, a Node-B, an evolved node-B ("eNB"), a 5G node-B ("gNB"), a Home Node-B, a relay node, a device, a core network, an aerial server, a radio access node, an access point ("AP"), new radio ("NR"), a network entity, an access and mobility management function ("AMF"), a unified data management ("UDM"), a unified data repository ("UDR"), a UDM/UDR, a policy control function ("PCF"), a radio access network ("RAN"), a network slice selection function ("NSSF"), an operations, administration, and management ("OAM"), a session management function ("SMF"), a user plane function ("UPF"), an application function, an authentication server function ("AUSF"), security anchor functionality ("SEAF"), trusted non-3GPP gateway function ("TNGF"), or by any other terminology used in the art. The network units 104 are generally part of a radio access network that includes one or more controllers communicably coupled to one or more corresponding network units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communication system 100 is compliant with NR protocols standardized in third generation partnership project ("3GPP"), wherein the network unit 104 transmits using an OFDM modulation scheme on the downlink ("DL") and the remote units 102 transmit on the uplink ("UL") using a single-carrier frequency division multiple access ("SC-FDMA") scheme or an orthogonal frequency division multiplexing ("OFDM") scheme. More generally, however, the wireless communication system 100 may implement some other open or proprietary communication protocol, for example, WiMAX, institute of electrical and electronics engineers ("IEEE") 802.11 variants, global system for mobile communications ("GSM"), general packet radio service ("GPRS"), universal mobile telecommunications system ("UMTS"), long term evolution ("LTE") variants, code division multiple access 2000 ("CDMA2000"), Bluetooth®, ZigBee, Sigfoxx, among other protocols. The present disclosure is not intended to be limited to the implementation of any particular wireless communication system architecture or protocol.

The network units 104 may serve a number of remote units 102 within a serving area, for example, a cell or a cell sector via a wireless communication link. The network units 104 transmit DL communication signals to serve the remote units 102 in the time, frequency, and/or spatial domain.

In various embodiments, a remote unit 102 may determine a first transmission of first uplink control information (UCI) on a first physical uplink control channel (PUCCH) of a first priority, the first PUCCH being based on a first PUCCH configuration. In some embodiments, the remote unit 102 may determine a second transmission of second UCI on a second PUCCH of a second priority, the second PUCCH being based on a second PUCCH configuration. In certain embodiments, the remote unit 102 may, in response to determining that the first PUCCH of the first priority overlaps in time with the second PUCCH of the second priority, multiplex at least part of the first UCI with the second UCI on a third PUCCH of the second priority, the third PUCCH being based on the second PUCCH configuration. The second priority is higher than the first priority. Accordingly, the remote unit 102 may be used for multiplexing uplink control information of different priorities.

In certain embodiments, a network unit 104 may schedule a first transmission of first uplink control information (UCI) by a user equipment (UE) on a first physical uplink control channel (PUCCH) of a first priority, the first PUCCH being based on a first PUCCH configuration. In some embodiments, the network unit 104 may schedule a second transmission of second UCI by the UE on a second PUCCH of a second priority, the second PUCCH being based on a second PUCCH configuration. The second PUCCH of the second priority overlaps in time with the first PUCCH of the first priority. In certain embodiments, the network unit 104 may receive a multiplexed transmission comprising at least part of the first UCI with the second UCI on a third PUCCH of the second priority, the third PUCCH being based on the second PUCCH configuration. Accordingly, the network unit 104 may be used for multiplexing uplink control information of different priorities.

Figure 2:
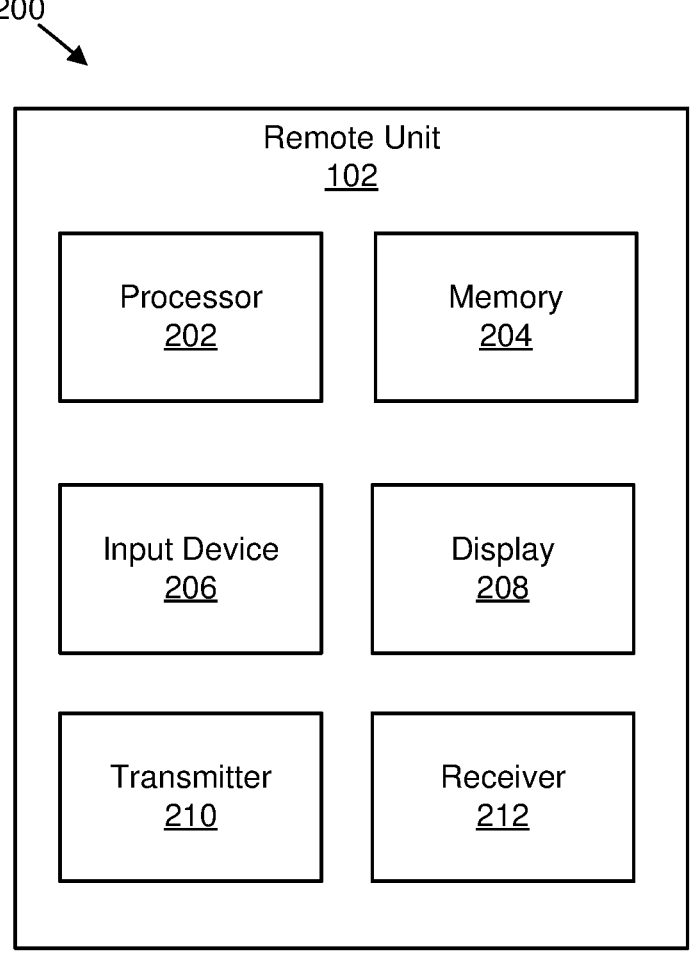
FIG. 2 is a schematic block diagram illustrating one embodiment of an apparatus that may be used for multiplexing uplink control information of different priorities.

FIG. 2 depicts one embodiment of an apparatus 200 that may be used for multiplexing uplink control information of different priorities. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, a liquid crystal display ("LCD"), a light emitting diode ("LED") display, an organic light emitting diode ("OLED") display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

In certain embodiments, the processor 202: determines a first transmission of first uplink control information (UCI) on a first physical uplink control channel (PUCCH) of a first priority, the first PUCCH being based on a first PUCCH configuration; determines a second transmission of second UCI on a second PUCCH of a second priority, the second PUCCH being based on a second PUCCH configuration; and, in response to determining that the first PUCCH of the first priority overlaps in time with the second PUCCH of the second priority, multiplexes at least part of the first UCI with the second UCI on a third PUCCH of the second priority, the third PUCCH being based on the second PUCCH configuration. The second priority is higher than the first priority.

Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
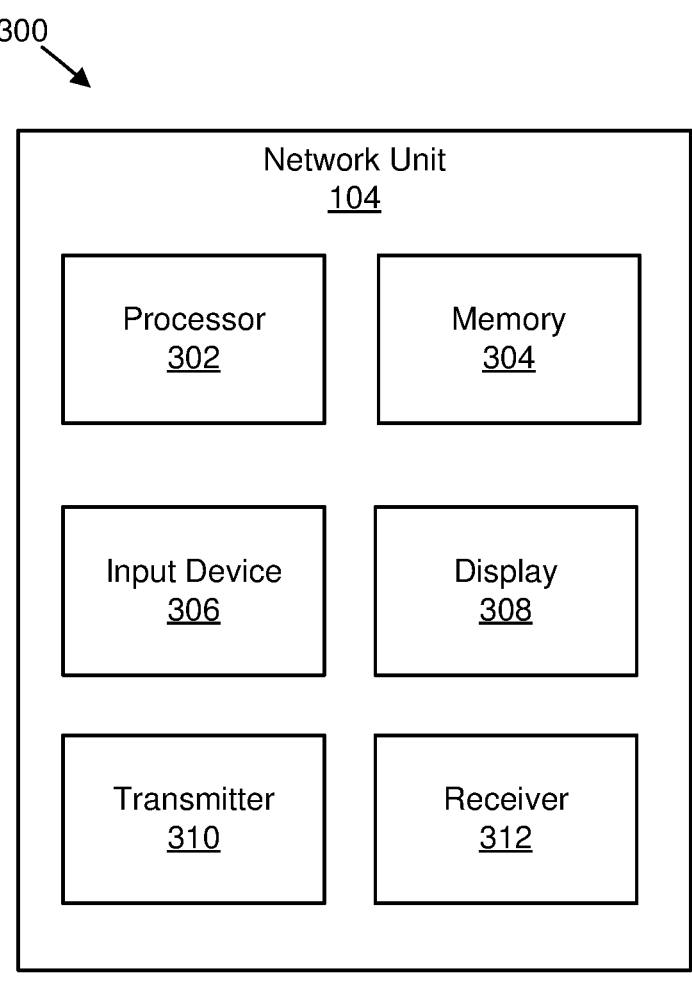
FIG. 3 is a schematic block diagram illustrating one embodiment of an apparatus that may be used for multiplexing uplink control information of different priorities.

FIG. 3 depicts one embodiment of an apparatus 300 that may be used for multiplexing uplink control information of different priorities. The apparatus 300 includes one embodiment of the network unit 104. Furthermore, the network unit 104 may include a processor 302, a memory 304, an input device 306, a display 308, a transmitter 310, and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

In certain embodiments, the processor 302: schedules a first transmission of first uplink control information (UCI) by a user equipment (UE) on a first physical uplink control channel (PUCCH) of a first priority, the first PUCCH being based on a first PUCCH configuration; and schedules a second transmission of second UCI by the UE on a second PUCCH of a second priority, the second PUCCH being based on a second PUCCH configuration. The second PUCCH of the second priority overlaps in time with the first PUCCH of the first priority. In various embodiments, the receiver 312 receives a multiplexed transmission comprising at least part of the first UCI with the second UCI on a third PUCCH of the second priority, the third PUCCH being based on the second PUCCH configuration. The second priority is higher than the first priority.

In certain embodiments, a user equipment ("UE") may be indicated to generate two hybrid automatic repeat request ("HARQ") acknowledgement ("ACK") ("HARQ-ACK") codebooks, one associated with a high priority physical uplink control channel ("PUCCH") and the other associated with a low priority PUCCH. If the UE would transmit a PUCCH or a physical uplink shared channel ("PUSCH") of a higher priority index that fully or partially overlaps with transmission of a PUCCH or PUSCH of a lower priority index, the UE cancels the transmission of the PUCCH or PUSCH of the lower priority index. If the cancelled transmission of the PUCCH or PUSCH of the lower priority index includes low priority ("LP") HARQ-ACK information, HARQ-ACK feedback with the LP HARQ-ACK information may also be cancelled. If cancellation of HARQ-ACK feedback occurs frequently, downlink throughput corresponding to low priority downlink ("DL") packets (e.g., enhanced mobile broadband ("eMBB") traffic) may be significantly degraded.

In some embodiments, a UE may multiplex uplink control information ("UCI") of different priorities in a PUCCH or a PUSCH.

In various embodiments, there may be a UE procedure for reporting control information.

In certain embodiments, a PUSCH or a PUCCH transmission including repetitions, if any, can be of priority index 0 or of priority index 1. For a configured grant PUSCH transmission, a UE determines a priority index from priority, if provided. For a PUCCH transmission with HARQ-ACK information corresponding to a SPS PDSCH reception or a SPS PDSCH release, a UE determines a priority index from harq-CodebookID, if provided. For a PUCCH transmission with SR, a UE determines the corresponding priority. For a PUSCH transmission with semi-persistent CSI report, a UE determines a priority index from a priority indicator field, if provided, in a DCI format 0_1 or DCI format 0_2 that activates the semi-persistent CSI report. If a priority index is not provided to a UE for a PUSCH or a PUCCH transmission, the priority index is 0.

In some embodiments, if a UE is provided two PUCCH-Config: 1) if the UE is provided subslotLengthForPUCCH-r16 in the first PUCCH-Config, the PUCCH resource for any SR configuration with priority index 0 or any CSI report configuration in any PUCCH-Config is within the subslot-LengthForPUCCH-r16 symbols in the first PUCCH-Config; and/or 2) if the UE is provided subslotLengthForPUCCH-r16 in the second PUCCH-Config, the PUCCH resource for any SR configuration with priority index 1 in any PUCCH-Config is within the subslotLengthForPUCCH-r16 symbols in the second PUCCH-Config.

In various embodiments, if in an active DL BWP a UE monitors PDCCH either for detection of DCI format 0_1 and DCI format 1_1 or for detection of DCI format 0_2 and DCI format 1_2, a priority index can be provided by a priority indicator field. If a UE indicates a capability to monitor, in an active DL BWP, PDCCH for detection of DCI format 0_1 and DCI format 1_1 and for detection of DCI format 0_2 and DCI format 1_2, a DCI format 0_1 or a DCI format 0_2 can schedule a PUSCH transmission of any priority and a DCI format 1_1 or a DCI format 1_2 can schedule a PDSCH reception and trigger a PUCCH transmission with corresponding HARQ-ACK information of any priority.

In certain embodiments, if a UE determines overlapping for PUCCH and/or PUSCH transmissions of different priority indexes, the UE first resolves the overlapping for PUCCH and/or PUSCH transmissions of smaller priority index. Then: 1) if a transmission of a first PUCCH of larger priority index scheduled by a DCI format in a PDCCH reception would overlap in time with a transmission of a second PUSCH or a second PUCCH of smaller priority index, the UE cancels the transmission of the second PUSCH or the second PUCCH before the first symbol that would overlap with the first PUCCH transmission; and/or 2) if a transmission of a first PUSCH of larger priority index scheduled by a DCI format in a PDCCH reception would overlap in time with a transmission of a second PUCCH of smaller priority index, the UE cancels the transmission of the second PUCCH before the first symbol that would overlap with the first PUSCH transmission, where: a) the overlapping is applicable before or after resolving overlapping among channels of larger priority index, if any, and b) the UE expects that the transmission of the first PUCCH or the first PUSCH, respectively, would not start before $T_{proc,2}+d_1$ after a last symbol of the corresponding PDCCH reception, c) $T_{proc,2}$ is the PUSCH preparation time for a corresponding UE processing capability assuming $d_{2,1}=0$, based on μ and $N_2$ as subsequently defined in this Clause, and $d_1$ is determined by a reported UE capability.

In some embodiments, if a UE is scheduled by a DCI format in a first PDCCH reception to transmit a first PUCCH or a first PUSCH of larger priority index that overlaps with a second PUCCH or a second PUSCH transmission of smaller priority index that, if any, is scheduled by a DCI format in a second PDCCH: 1) $T_{proc,2}$ is based on a value of μ corresponding to the smallest SCS configuration of the first PDCCH, the second PDCCHs, the first PUCCH or the first PUSCH, and the second PUCCHs or the second PUSCHs; 2) if the overlapping group includes the first PUCCH; 3) if processingType2Enabled of PDSCH-Serving-CellConfig is set to enable for the serving cell where the UE receives the first PDCCH and for all serving cells where the UE receives the PDSCHs corresponding to the second PUCCHs, and if processingType2Enabled of PUSCH-ServingCellConfig is set to enable for the serving cells with the second PUSCHs, N2 is 5 for $\mu=0$, 5.5 for $\mu=1$ and 11 for $\mu=2$; 4) else, N2 is 10 for $\mu=0$, 12 for $\mu=1$, 23 for $\mu=2$, and 36 for $\mu=3$; 5) if the overlapping group includes the first PUSCH; 6) if processingType2Enabled of PUSCH-ServingCellConfig is set to enable for the serving cells with the first PUSCH and the second PUSCHs and if processingType2Enabled of PDSCH-ServingCellConfig is set to enable for all serving cells where the UE receives the PDSCHs corresponding to the second PUCCHs, N2 is 5 for $\mu=0$, 5.5 for $\mu=1$ and 11 for $\mu=2$; and/or 7) else, N2 is 10 for $\mu=0$, 12 for $\mu=1$, 23 for $\mu=2$, and 36 for $\mu=3$.

In various embodiments, if a UE would transmit the following channels that would overlap in time: 1) a first PUCCH of larger priority index with SR and a second PUCCH or PUSCH of smaller priority index; 2) a configured grant PUSCH of larger priority index and a PUCCH of smaller priority index; 3) a first PUCCH of larger priority index with HARQ-ACK information only in response to a PDSCH reception without a corresponding PDCCH and a second PUCCH of smaller priority index with SR and/or CSI, or a configured grant PUSCH with smaller priority index, or a PUSCH of smaller priority index with SP-CSI report(s) without a corresponding PDCCH; 4) a PUSCH of larger priority index with SP-CSI reports(s) without a corresponding PDCCH and a PUCCH of smaller priority index with SR, or CSI, or HARQ-ACK information only in response to a PDSCH reception without a corresponding PDCCH; and/or 5) a configured grant PUSCH of larger priority index and a configured PUSCH of lower priority index on a same serving cell. In such embodiments, the UE is expected to cancel the PUCCH and/or PUSCH transmissions of smaller priority index before the first symbol overlapping with the PUCCH and/or PUSCH transmission of larger priority index.

In certain embodiments, a UE does not expect to be scheduled to transmit a PUCCH or a PUSCH with smaller priority index that would overlap in time with a PUCCH of larger priority index with HARQ-ACK information only in response to a PDSCH reception without a corresponding PDCCH. A UE does not expect to be scheduled to transmit a PUCCH of smaller priority index that would overlap in time with a PUSCH of larger priority index with SP-CSI report(s) without a corresponding PDCCH.

In some embodiments, a UE multiplexes UCIs with same priority index in a PUCCH or a PUSCH. A PUCCH or a PUSCH is assumed to have a same priority index as a priority index of UCIs a UE multiplexes in the PUCCH or the PUSCH.

In various embodiments, if a UE is provided subslot-LengthForPUCCH-r16, a slot for an associated PUCCH transmission includes a number of symbols indicated by subslotLengthForPUCCH-r16.

In certain embodiments, if a UE would transmit on a serving cell a PUSCH without UL-SCH that overlaps with a PUCCH transmission on a serving cell that includes positive SR information, the UE does not transmit the PUSCH.

In some embodiments, if a UE would transmit CSI reports on overlapping physical channels, the UE applies the priority rules described in for the multiplexing of CSI reports.

In various embodiments, if a UE has overlapping resources for PUCCH transmissions in a slot and at least one of the PUCCH transmissions is with repetitions over multiple slots, the UE first follows the procedures for resolving the overlapping among the resources for the PUCCH transmissions.

In certain embodiments, if a UE would multiplex UCI in a PUCCH transmission that overlaps with a PUSCH transmission, and the PUSCH and PUCCH transmissions fulfill conditions for UCI multiplexing, the UE: 1) multiplexes only HARQ-ACK information, if any, from the UCI in the PUSCH transmission and does not transmit the PUCCH if the UE multiplexes aperiodic or semi-persistent CSI reports in the PUSCH; and/or 2) multiplexes only HARQ-ACK information and CSI reports, if any, from the UCI in the PUSCH transmission and does not transmit the PUCCH if the UE does not multiplex aperiodic or semi-persistent CSI reports in the PUSCH.

In some embodiments, a UE does not expect to multiplex in a PUSCH transmission in one slot with SCS configuration $\mu_1$ UCI of same type that the UE would transmit in PUCCHs in different slots with SCS configuration $\mu_2$ if $\mu_1 < \mu_2$.

In various embodiments, a UE does not expect to multiplex in a PUSCH transmission or in a PUCCH transmission HARQ-ACK information that the UE would transmit in different PUCCHs.

In certain embodiments, a UE does not expect a PUCCH resource that results from multiplexing overlapped PUCCH resources, if applicable, to overlap with more than one PUSCHs if each of the more than one PUSCHs includes aperiodic CSI reports.

In some embodiments, a UE does not expect to detect a DCI format scheduling a PDSCH reception or a SPS PDSCH release, or a DCI format including a One-shot HARQ-ACK request field with value 1, and indicating a resource for a PUCCH transmission with corresponding HARQ-ACK information in a slot if the UE previously detects a DCI format scheduling a PUSCH transmission in the slot and if the UE multiplexes HARQ-ACK information in the PUSCH transmission.

In various embodiments, if a UE multiplexes aperiodic CSI in a PUSCH and the UE would multiplex UCI that includes HARQ-ACK information in a PUCCH that overlaps with the PUSCH and the timing conditions for overlapping PUCCHs and PUSCHs are fulfilled, the UE multiplexes only the HARQ-ACK information in the PUSCH and does not transmit the PUCCH.

In certain embodiments, if a UE transmits multiple PUSCHs in a slot on respective serving cells that include first PUSCHs that are scheduled by DCI formats and second PUSCHs configured by respective ConfiguredGrantConfig or semiPersistentOnPUSCH, and the UE would multiplex UCI in one of the multiple PUSCHs, and the multiple PUSCHs fulfil the conditions for UCI multiplexing, the UE multiplexes the UCI in a PUSCH from the first PUSCHs.

In some embodiments, if a UE transmits multiple PUSCHs in a slot on respective serving cells and the UE would multiplex UCI in one of the multiple PUSCHs and the UE does not multiplex aperiodic CSI in any of the multiple PUSCHs, the UE multiplexes the UCI in a PUSCH of the serving cell with the smallest ServCellIndex subject to the conditions for UCI multiplexing being fulfilled. If the UE transmits more than one PUSCHs in the slot on the serving cell with the smallest ServCellIndex that fulfil the conditions for UCI multiplexing, the UE multiplexes the UCI in the earliest PUSCH that the UE transmits in the slot.

In various embodiments, if a UE transmits a PUSCH over multiple slots and the UE would transmit a PUCCH with HARQ-ACK and/or CSI information over a single slot that overlaps with the PUSCH transmission in one or more slots of the multiple slots, and the PUSCH transmission in the one or more slots fulfills the conditions for multiplexing the HARQ-ACK and/or CSI information, the UE multiplexes the HARQ-ACK and/or CSI information in the PUSCH transmission in the one or more slots. The UE does not multiplex HARQ-ACK and/or CSI information in the PUSCH transmission in a slot from the multiple slots if the UE would not transmit a single-slot PUCCH with HARQ-ACK and/or CSI information in the slot in case the PUSCH transmission was absent.

In certain embodiments, if a UE transmits a PUSCH with repetition Type B and the UE would transmit a PUCCH with HARQ-ACK and/or CSI information over a single slot that overlaps with the PUSCH transmission in one or more slots, the UE expects all actual repetitions of the PUSCH transmission that would overlap with the PUCCH transmission to fulfill the conditions for multiplexing the HARQ-ACK and/or CSI information, and the UE multiplexes the HARQ-ACK and/or CSI information in the earliest actual PUSCH repetition of the PUSCH transmission that would overlap with the PUCCH transmission and includes more than one symbol. The UE does not expect that all actual repetitions that would overlap with the PUCCH transmission do not include more than one symbol.

In some embodiments, if the PUSCH transmission over the multiple slots is scheduled by a DCI format that includes a DAI field, the value of the DAI field is applicable for multiplexing HARQ-ACK information in the PUSCH transmission in any slot from the multiple slots where the UE multiplexes HARQ-ACK information.

In various embodiments, if a UE would multiplex HARQ-ACK information in a PUSCH transmission that is configured by a ConfiguredGrantConfig, and includes CG-UCI, the UE multiplexes the HARQ-ACK information in the PUSCH transmission if the UE is provided cg-CG-UCI-Multiplexing; otherwise, the UE does not transmit the PUSCH and multiplexes the HARQ-ACK information in a PUCCH transmission or in another PUSCH transmission.

In certain embodiments, there may be HARQ-ACK codebook determination.

In some embodiments, if a UE is provided pdsch-HARQ-ACK-Codebook-List, the UE can be indicated by pdsch-HARQ-ACK-Codebook-List to generate one or two HARQ-ACK codebooks. If the UE is indicated to generate one HARQ-ACK codebook, the HARQ-ACK codebook is associated with a PUCCH of priority index 0. If a UE is provided pdsch-HARQ-ACK-Codebook-List, the UE multiplexes in a same HARQ-ACK codebook only HARQ-ACK information associated with a same priority index. If the UE is indicated to generate two HARQ-ACK codebooks: 1) a first HARQ-ACK codebook is associated with a PUCCH of priority index 0 and a second HARQ-ACK codebook is associated with a PUCCH of priority index 1; and/or 2) the UE is provided first and second for each of {PUCCH-Config, UCI-OnPUSCH, PDSCH-codeBlockGroupTransmission} by {PUCCHConfigurationList, UCI-OnPUSCH-List, PDSCH-CodeBlockGroupTransmission-List}, respectively, for use with the first and second HARQ-ACK codebooks, respectively.

In various embodiments, if a UE receives a PDSCH without receiving a corresponding PDCCH, or if the UE receives a PDCCH indicating a SPS PDSCH release, the UE generates one corresponding HARQ-ACK information bit. If the UE generates two HARQ-ACK codebooks, the UE is indicated by harq-CodebookID, per SPS PDSCH configuration, a HARQ-ACK codebook index for multiplexing the corresponding HARQ-ACK information bit.

In certain embodiments, if a UE is provided pdsch-HARQ-ACK-OneShotFeedback-r16 and the UE detects a DCI format in any PDCCH monitoring occasion that includes a One-shot HARQ-ACK request field with value 1: 1) the UE includes the HARQ-ACK information in a Type-3 HARQ-ACK codebook; and/or 2) the UE does not expect that the PDSCH-to-HARQ_feedback timing indicator field of the DCI format provides an inapplicable value from dl-DataToUL-ACK.

In some embodiments, reference is to one HARQ-ACK codebook and to DCI formats that schedule PDSCH reception, or indicate SPS PDSCH release, or indicate SCell dormancy without scheduling a PDSCH reception and are associated with the HARQ-ACK codebook.

In various embodiments, if a UE is configured to receive SPS PDSCHs in a slot for SPS configurations that are indicated to be released by a DCI format, and if the UE receives the PDCCH providing the DCI format in the slot where the end of a last symbol of the PDCCH reception is not after the end of a last symbol of any of the SPS PDSCH receptions, and if HARQ-ACK information for the SPS PDSCH release and the SPS PDSCH receptions would be multiplexed in a same PUCCH, the UE does not expect to receive the SPS PDSCHs, does not generate HARQ-ACK information for the SPS PDSCH receptions, and generates a HARQ-ACK information bit for the SPS PDSCH release.

In certain embodiments, if a UE detects a DCI format 1_1 indicating SCell dormancy without scheduling a PDSCH reception, and is provided pdsch-HARQ-ACK-Codebook=dynamic or enhancedDynamic-r16, the UE generates a HARQ-ACK information bit for a DCI format 1_1 indicating SCell dormancy and the HARQ-ACK information bit value is ACK.

In some embodiments, if a UE is not provided PDSCH-CodeBlockGroupTransmission, the UE generates one HARQ-ACK information bit per transport block.

In various embodiments, for a HARQ-ACK information bit, a UE generates a positive acknowledgement ("ACK") if the UE detects a DCI format that provides a SPS PDSCH release or correctly decodes a transport block, and generates a negative acknowledgement ("NACK") if the UE does not correctly decode the transport block. A HARQ-ACK information bit value of 0 represents a NACK while a HARQ-ACK information bit value of 1 represents an ACK.

As used herein, the CRC for a DCI format is scrambled with a C-RNTI, an MCS-C-RNTI, or a CS-RNTI.

In certain embodiments, there may be a UE procedure for reporting HARQ-ACK.

In some embodiments, a UE does not expect to transmit more than one PUCCH with HARQ-ACK information in a slot.

In various embodiments, for DCI format 10, the PDSCH-to-HARQ_feedback timing indicator field values map to {1, 2, 3, 4, 5, 6, 7, 8}. For a DCI format, other than DCI format 1_0, scheduling a PDSCH reception or a SPS PDSCH release, the PDSCH-to-HARQ_feedback timing indicator field values, if present, map to values for a set of number of slots provided by dl-DataToUL-ACK, or dl-DataToUL-ACKForDCIFormat1_2 for DCI format 1_2.

In certain embodiments, for a SPS PDSCH reception ending in slot n, the UE transmits the PUCCH in slot n+k where k is provided by the PDSCH-to-HARQ_feedback timing indicator field, if present, in a DCI format activating the SPS PDSCH reception.

In some embodiments, if the UE detects a DCI format that does not include a PDSCH-to-HARQ_feedback timing indicator field and schedules a PDSCH reception or activates a SPS PDSCH reception ending in slot n, the UE provides corresponding HARQ-ACK information in a PUCCH transmission within slot n+k where k is provided by dl-Data-ToUL-ACK, or by dl-DataToUL-ACKForDCIFormat1_2 for DCI format 1_2.

In various embodiments, with reference to slots for PUCCH transmissions, if the UE detects a DCI format scheduling a PDSCH reception ending in slot n or if the UE detects a DCI format indicating a SPS PDSCH release through a PDCCH reception ending in slot n, or if the UE detects a DCI format that requests Type-3 HARQ-ACK codebook report and does not schedule a PDSCH reception through a PDCCH reception ending in slot n, the UE provides corresponding HARQ-ACK information in a PUCCH transmission within slot n+k, where k is a number of slots and is indicated by the PDSCH-to-HARQ_feedback timing indicator field in the DCI format, if present, or provided by dl-DataToUL-ACK, or by dl-DataToUL-ACK-ForDCIFormat1_2 for DCI format 1_2. k=0 corresponds to PUCCH resources provided by PUCCH-ResourceSet with a maximum of eight PUCCH resources. If the PUCCH resource indicator field includes 1 bit or 2 bits, the values map to the first two values or the first four values, respectively, of a table. If the last DCI format does not include a PUCCH resource indicator field, the first value of a table is used.

In certain embodiments, for the first set of PUCCH resources and when the size $R_{PUCCH}$ of resourceList is larger than eight, when a UE provides HARQ-ACK information in a PUCCH transmission in response to detecting a last DCI format in a PDCCH reception, among DCI formats with a value of the PDSCH-to-HARQ_feedback timing indicator field, if present, or a value of dl-DataToUL-ACK, or a value of dl-DataToUL-ACKForDCIFormat1_2 for DCI format 1_2, indicating a same slot for the PUCCH transmission, the UE determines a PUCCH resource with index $r_{PUCCH}$, $0 \leq r_{PUCCH} \leq R_{PUCCH}-1$, as $$r_{PUCCH} = \begin{cases} \left\lfloor \dfrac{n_{CCE,p} \cdot \lceil R_{PUCCH}/8 \rceil}{n_{CCE,p}} \right\rfloor + \Delta_{PRI} \cdot \left\lceil \dfrac{R_{PUCCH}}{8} \right\rceil & \text{if } \Delta_{PRI} < R_{PUCCH} \bmod 8 \\ \left\lfloor \dfrac{n_{CCE,p} \cdot \lfloor R_{PUCCH}/8 \rfloor}{n_{CCE,p}} \right\rfloor + \Delta_{PRI} \cdot \left\lfloor \dfrac{R_{PUCCH}}{8} \right\rfloor + R_{PUCCH} \bmod 8 & \text{if } \Delta_{PRI} \geq R_{PUCCH} \bmod 8 \end{cases},$$

the last slot of the PUCCH transmission that overlaps with the PDSCH reception or with the PDCCH reception in case of SPS PDSCH release or in case of the DCI format that requests Type-3 HARQ-ACK codebook report and does not schedule a PDSCH reception.

In certain embodiments, a PUCCH transmission with HARQ-ACK information is subject to the limitations for UE transmissions.

In some embodiments, for a PUCCH transmission with HARQ-ACK information, a UE determines a PUCCH resource after determining a set of PUCCH resources for $O_{UCI}$ HARQ-ACK information bits. The PUCCH resource determination is based on a PUCCH resource indicator field, if present, in a last DCI format, among the DCI formats that have a value of a PDSCH-to-HARQ_feedback timing indicator field, if present, or a value of dl-DataToUL-ACK, or a value of dl-DataToUL-ACKForDCIFormat1_2 for DCI format 1_2, indicating a same slot for the PUCCH transmission, that the UE detects and for which the UE transmits corresponding HARQ-ACK information in the PUCCH where, for PUCCH resource determination, detected DCI formats are first indexed in an ascending order across serving cells indexes for a same PDCCH monitoring occasion and are then indexed in an ascending order across PDCCH monitoring occasion indexes. For indexing DCI formats within a serving cell for a same PDCCH monitoring occasion, if the UE is not provided CORESETPoolIndex or is provided CORESETPoolIndex with value 0 for one or more first CORESETs and is provided CORESETPoolIndex with value 1 for one or more second CORESETs on an active DL BWP of a serving cell, and with ackNackFeedbackMode-r16=joint for the active UL BWP, detected DCI formats from PDCCH receptions in the first CORESETs are indexed prior to detected DCI formats from PDCCH receptions in the second CORESETs.

In various embodiments, the PUCCH resource indicator field values map to values of a set of PUCCH resource indexes for a PUCCH resource indicator field of 3 bits, provided by resourceList for PUCCH resources from a set of where $N_{CCE,p}$ is a number of CCEs in CORESET p of the PDCCH reception for the DCI format, $n_{CCE,p}$ is the index of a first CCE for the PDCCH reception, and $\Delta_{PRI}$ is a value of the PUCCH resource indicator field in the DCI format. If the DCI format does not include a PUCCH resource indicator field, $\Delta_{PRI}=0$.

In some embodiments, if a UE detects a first DCI format indicating a first resource for a PUCCH transmission with corresponding HARQ-ACK information in a slot and also detects at a later time a second DCI format indicating a second resource for a PUCCH transmission with corresponding HARQ-ACK information in the slot, the UE does not expect to multiplex HARQ-ACK information corresponding to the second DCI format in a PUCCH resource in the slot if the PDCCH reception that includes the second DCI format is not earlier than $N_3 \cdot (2048+144) \cdot \kappa \cdot 2^{-\mu} \cdot T_C$ from the beginning of a first symbol of the first resource for PUCCH transmission in the slot where, $\kappa$ and $T_C$ are defined and corresponds to the smallest SCS configuration among the SCS configurations of the PDCCHs providing the DCI formats and the SCS configuration of the PUCCH. If processingType2Enabled of PDSCH-ServingCellConfig is set to enable for the serving cell with the second DCI format and for all serving cells with corresponding HARQ-ACK information multiplexed in the PUCCH transmission in the slot, $N_3=3$ for $\mu=0$, $N_3=4.5$ for $\mu=1$, $N_3=9$ for $\mu=2$; otherwise, $N_3=8$ for $\mu=0$, $N_3=10$ for $\mu=1$, $N_3=17$ for $\mu=2$, $N_3=20$ for $\mu=3$.

In various embodiments, if a UE is not provided SPS-PUCCH-AN-List and transmits HARQ-ACK information corresponding only to a PDSCH reception without a corresponding PDCCH, a PUCCH resource for corresponding PUCCH transmission with HARQ-ACK information is provided by n1PUCCH-AN.

In certain embodiments, if a UE transmits a PUCCH with HARQ-ACK information using PUCCH format 0, the UE determines values $m_0$ and $m_{CS}$ for computing a value of cyclic shift $\alpha$ where $m_0$ is provided by initialCyclicShift of PUCCH-format0 or, if initialCyclicShift is not provided, by the initial cyclic shift index and $m_{CS}$ is determined from the value of one HARQ-ACK information bit or from the values of two HARQ-ACK information bits as in Table 1 and Table 2, respectively.

TABLE 1

| Mapping of values for one HARQ-ACK information bit to sequences for PUCCH format 0 | | |
|---|---|---|
| HARQ-ACK Value | 0 | 1 |
| Sequence cyclic shift | $m_{cs} = 0$ | $m_{cs} = 6$ |

TABLE 2

| Mapping of values for two HARQ-ACK information bits to sequences for PUCCH format 0 | | | | |
|---|---|---|---|---|
| HARQ-ACK Value | {0, 0} | {0, 1} | {1, 1} | {1, 0} |
| Sequence cyclic shift | $m_{cs} = 0$ | $m_{cs} = 3$ | $m_{cs} = 6$ | $m_{cs} = 9$ |

In some embodiments, if a UE transmits a PUCCH with HARQ-ACK information using PUCCH format 1, the UE is provided a value for $m_0$ by initialCyclicShift of PUCCH-format1 or, if initialCyclicShift is not provided, by the initial cyclic shift index.

In various embodiments, if a UE transmits a PUCCH with $O_{ACK}$ HARQ-ACK information bits and $O_{CRC}$ bits using PUCCH format 2 or PUCCH format 3 in a PUCCH resource that includes $$M_{RB}^{PUCCH}$$

PRBs, the UE determines a number of PRBs $$M_{RB,min}^{PUCCH}$$

for the PUCCH transmission to be the minimum number of PRBs, that is smaller than or equal to a number of PRBs $$M_{RB}^{PUCCH}$$

provided respectively by nrofPRBs of PUCCH-format2 or nrofPRBs of PUCCH-format3 and start from the first PRB from the number of PRBs, that results to $$(O_{ACK} + O_{CRC}) \leq M_{RB,min}^{PUCCH} \cdot N_{sc,ctrl}^{RB} \cdot N_{symb-UCI}^{PUCCH} \cdot Q_m \cdot r \text{ and,}$$

if $$M_{RB}^{PUCCH} > 1, (O_{ACK} + O_{CRC}) > (M_{RB,min}^{PUCCH} - 1) \cdot N_{sc,ctrl}^{RB} \cdot N_{symb-UCI}^{PUCCH} \cdot Q_m \cdot r,$$

where $$N_{sc,ctrl}^{RB}, N_{symb,UCI}^{PUCCH}, Q_m, \text{ and } r$$

are defined. For PUCCH format 3, if $$M_{RB,min}^{PUCCH}$$

is not equal $2^{\alpha_2} \cdot 3^{\alpha_3} \cdot 5^{\alpha_5}$, $$M_{RB,min}^{PUCCH}$$

is increased to the nearest allowed value of nrofPRBs for PUCCH-format3. If $$(O_{ACK} + O_{CRC}) > (M_{RB}^{PUCCH} - 1) \cdot N_{sc,ctrl}^{RB} \cdot N_{symb-UCI}^{PUCCH} \cdot Q_m \cdot r,$$

the UE transmits the PUCCH over $$M_{RB}^{PUCCH}$$

PRBs.

In certain embodiments, if a UE is provided a first interlace of $$M_{Interlace,0}^{PUCCH}$$

PRBs by interlace0 in InterlaceAllocation-r16 and transmits a PUCCH with $O_{ACK}$ HARQ-ACK information bits and $O_{CRC}$ bits using PUCCH format 2 or PUCCH format 3, the UE transmits the PUCCH over the first interlace if $$(O_{ACK} + O_{CRC}) \leq M_{Interlace,0}^{PUCCH} \cdot N_{sc,ctrl}^{RB} \cdot N_{symb-UCI}^{PUCCH} \cdot Q_m \cdot r;$$

otherwise, if the UE is provided a second interlace by interlace1 in PUCCH-format2 or PUCCH-format3, the UE transmits the PUCCH over the first and second interlaces.

In some embodiments, if a UE would transmit SR in a resource using PUCCH format 0 and HARQ-ACK information bits in a resource using PUCCH format 1 in a slot, the UE transmits only a PUCCH with the HARQ-ACK information bits in the resource using PUCCH format 1.

In various embodiments, if the UE would transmit positive SR in a first resource using PUCCH format 1 and at most two HARQ-ACK information bits in a second resource using PUCCH format 1 in a slot, the UE transmits a PUCCH with HARQ-ACK information bits in the first resource using PUCCH format 1. If a UE would not transmit a positive SR in a resource using PUCCH format 1 and would transmit at most two HARQ-ACK information bits in a resource using PUCCH format 1 in a slot, the UE transmits a PUCCH in the resource using PUCCH format 1 for HARQ-ACK information.

In certain embodiments, CG-UCI may be used.

In some embodiments, for CG-UCI bits transmitted on a CG PUSCH, the CG-UCI bit sequence $a_0, a_1, a_2, a_3, \ldots, a_{A-1}$ is determined as follows: set $$a_i = \partial_i^{CG-UCI}$$

for $i=0, 1, \ldots, O^{CG-UCI}-1$ and $A=O^{CG-UCI}$, where the CG-UCI bit sequence $$\partial_0^{CG-UCI}, \partial_1^{CG-UCI}, \ldots, \partial_{O^{CG-UCI}-1}^{CG-UCI}$$

is given by Table 3, mapped in the order from upper part to lower part.

TABLE 3

| Mapping order of CG-UCI fields | |
|---|---|
| Field | Bitwidth |
| HARQ process number | 4 |
| Redundancy version | 2 |
| New data indicator | 1 |
| Channel Occupancy Time (COT) sharing information | [log₂C] if both higher layer parameter ULtoDL-CO-SharingED-Threshold-r16 and higher layer parameter cg-COT-SharingList-r16 are configured, where C is the number of combinations configured in cg-COT-SharingList-r16; 1 if higher layer parameter ULtoDL-CO-SharingED-Threshold-r16 is not configured and higher layer parameter cg-COT-SharingOffset-r16 is configured; 0 otherwise; If a UE indicates COT sharing other than "no sharing" in a CG PUSCH within the UE's initiated COT, the UE should provide consistent COT sharing information in all the subsequent CG PUSCHs, if any, occurring within the same UE's initiated COT such that the same DL starting point and duration are maintained. |

In various embodiments, there may be HARQ-ACK and CG-UCI used.

In certain embodiments, if higher layer parameter cg-CG-UCI-Multiplexing is configured, the UCI bit sequence $a_0, a_1, a_2, a_3, \ldots, a_{A-1}$ is determined as follows, where $A=O^{CG-UCI}+O^{ACK}$.

In some embodiments, the CG-UCI bits are mapped to the UCI bit sequence $a_0, a_1, a_2, a_3, \ldots, a_{O^{CG-UCI}-1}$, where $$a_i = \partial_i^{CG-UCI}$$

for $i=0, 1, \ldots, O^{CG-UCI}-1$. The CG-UCI bit sequence $$\partial_0^{CG-UCI}, \partial_1^{CG-UCI}, \ldots, \partial_{O^{CG-UCI}-1}^{CG-UCI}$$

mapped in the order from upper part to lower part, and $O^{CG-UCI}$ is number of CG-UCI bits.

In various embodiments, the HARQ-ACK bits are mapped to the UCI bit sequence $a_{O^{CG-UCI}}, a_{O^{CG-UCI}-1} \ldots, a_{O^{CG-UCI}+O^{ACK}-1}$, where $$a_{i+o^{CG-UCI}} = \partial_i^{ACK}$$

for $i=0, 1, \ldots, O^{ACK}-1$. The HARQ-ACK bit sequence $$\partial_0^{ACK}, \partial_1^{ACK}, \ldots, \partial_{O^{ACK}-1}^{ACK},$$

and $O^{ACK}$ is number of HARQ-ACK bits.

Embodiments described herein may be for a UE with resources for PUCCH transmissions or for PUCCH and PUSCH transmissions that overlap in time. One or more elements or features from various embodiments described herein may be combined.

In certain embodiments, if a UE determines PUCCH and/or PUSCH transmissions of different priority indexes overlap, the UE first resolves the overlapping for the PUCCH and/or the PUSCH transmissions with the same priority index for each priority index.

A first embodiment may include a UE procedure for multiplexing UCI of different priorities in PUCCH. In such embodiments, LP HARQ-ACK and high priority ("HP") HARQ-ACK may be multiplexed with or without a HP scheduling request ("SR") in a PUCCH format 2, 3, or 4.

In some embodiments, a UE may be configured by maxCodeRateforMixedPriorities with a code rate for multiplexing HARQ-ACK, SR, and channel state information ("CSI") reports of different corresponding PUCCH priorities in a PUCCH transmission using PUCCH format 2, PUCCH format 3, or PUCCH format 4. If not configured, the UE assumes that maxCodeRate is a code rate for multiplexing HARQ-ACK, SR, and CSI reports of the same PUCCH priority in a PUCCH transmission using PUCCH format 2, PUCCH format 3, or PUCCH format 4 used for multiplexing UCI of different corresponding PUCCH priorities in a PUCCH transmission using PUCCH format 2, PUCCH format 3, or PUCCH format 4.

In various embodiments, as used herein: 1) $O_{ACK}$ is a total number of HARQ-ACK information bits, if any; 2) $O_{SR}$ is a total number of SR bits, $O_{SR}=0$ if there is no scheduling request bit, otherwise, $O_{SR}=\lceil \log_2(K+1) \rceil$; 3)

$$O_{CSI} = \sum_{n=1}^{N_{CSI}^{total}} (O_{CSI-part1,n} + O_{CSI-part2,n}),$$

where $O_{CSI-part1,n}$ is a number of Part 1 CSI report bits for CSI report with priority value n, $O_{CSI-part2,n}$ is a number of Part 2 CSI report bits, if any, for CSI report with priority value n [6, TS 38.214], and $$N_{CSI}^{total}$$

is a number of CSI reports that include overlapping CSI reports; and 4) $O_{CRC}=O_{CRC,CSI-part1}+O_{CRC,CSI-part2}$, where $O_{CRC,CSI-part1}$ is a number of CRC bits, if any, for encoding HARQ-ACK, SR and Part 1 CSI report bits and $O_{CRC,CSI-part2}$ is a number of CRC bits, if any, for encoding Part 2 CSI report bits.

In certain embodiments, as used herein: 1) r is a code rate given by maxCodeRate; 2)

$$M_{RB}^{PUCCH}$$

is a number of PRBs for PUCCH format 2, or PUCCH format 3, or PUCCH format 4, respectively, where $$M_{RB}^{PUCCH}$$

is provided by nrofPRBs in PUCCH-format2 for PUCCH format 2 or by nrofPRBs in PUCCH-format3 for PUCCH format 3, and $$M_{RB}^{PUCCH} = 1$$

for PUCCH format 4; 3)

$$N_{sc,ctrl}^{RB} = N_{sc}^{RB} - 4$$

for PUCCH format 2 or, if the PUCCH resource with PUCCH format 2 includes an orthogonal cover code with length $$N_{SF}^{PUCCH,2}$$

provided by OCC-Length-r16, $$N_{sc,ctrl}^{RB} = \left(N_{sc}^{RB} - 4\right)/N_{SF}^{PUCCH,2}, N_{sc,ctrl}^{RB} = N_{sc}^{RB}$$

for PUCCH format 3 or, if the PUCCH resource with PUCCH format 3 includes an orthogonal cover code with length $$N_{SF}^{PUCCH,3}$$

provided by OCC-Length-r16, $$N_{sc,ctrl}^{RB} = N_{sc}^{RB}/N_{SF}^{PUCCH,3}, \text{ and } N_{sc,ctrl}^{RB} = N_{sc}^{RB}/N_{SF}^{PUCCH,4}$$

for PUCCH format 4, where $$N_{sc}^{RB}$$

is a number of subcarriers per resource block; 4)

$$N_{symb-UCI}^{PUCCH}$$

is equal to a number of PUCCH symbols $$N_{symb}^{PUCCH,2}$$

for PUCCH format 2 provided by nrofSymbols in PUCCH-format2. For PUCCH format 3 or for PUCCH format 4, $$N_{symb-UCI}^{PUCCH}$$

is equal to a number of PUCCH symbols $$N_{symb}^{PUCCH,3}$$

for PUCCH format 3 or equal to a number of PUCCH symbols $$N_{symb}^{PUCCH,4}$$

for PUCCH format 4 provided by nrofSymbols in PUCCH-format3 or nrofSymbols in PUCCH-format4, respectively, after excluding a number of symbols used for demodulation reference signal ("DM-RS") transmission for PUCCH format 3 or for PUCCH format 4, respectively; and 5) $Q_m=1$ if pi/2-BPSK (binary phase shift keying "BPSK") is the modulation scheme and Q-=2 if quadrature phase shift keying ("QPSK") is the modulation scheme as indicated by pi2BPSK for PUCCH format 3 or PUCCH format 4. For PUCCH format 2, $Q_m=2$.

In some embodiments (e.g., case 1), there may be joint encoding of LP HARQ-ACK and HP HARQ-ACK and/or SR.

In various embodiments, if a UE would transmit HP HARQ-ACK with or without HP SR in a PUCCH of higher priority index that would overlap in time with a transmission of a PUCCH of lower priority index including LP HARQ-ACK, the UE jointly encodes HP HARQ-ACK with or without HP SR with LP HARQ-ACK if the PUCCH of lower priority index carrying LP HARQ-ACK is confined within a sub-slot where the transmission of the PUCCH of higher priority index occurs (and transmits the PUCCH of higher priority index). Further, the UE determines whether to multiplex the LP HARQ-ACK based on whether the total payload consisting of LP HARQ-ACK and HP HARQ-ACK with or without HP SR is less than a supportable payload based on configured parameters of the maximum code rate and the maximum number of PRBs of a given PUCCH format.

In one example, if a UE transmits a PUCCH with $O_{ACK}$ LP and HP HARQ-ACK information bits and $O_{CRC}$ bits using PUCCH format 2 or PUCCH format 3 in a PUCCH resource PUCCH that includes $$M_{RB}^{PUCCH}$$

PRBs, the UE determines a number of PRBs $$M_{RB,min}^{PUCCH}$$

for the PUCCH transmission to be the minimum number of PRBs, that is smaller than or equal to a number of PRBs $$M_{RB}^{PUCCH}$$

provided respectively by nrofPRBs of PUCCH-format2 or nrofPRBs of PUCCH-format3 and start from the first PRB from the number of PRBs, that results to $$(O_{ACK} + O_{CRC}) \leq M_{RB,min}^{PUCCH} \cdot N_{sc,ctrl}^{RB} \cdot N_{symb-UCI}^{PUCCH} \cdot Q_m \cdot r \text{ and,}$$

if $$M_{RB}^{PUCCH} > 1, (O_{ACK} + O_{CRC}) > \left(M_{RB,min}^{PUCCH} - 1\right) \cdot N_{symb-UCI}^{PUCCH} \cdot Q_m \cdot r,$$

where $$N_{sc,ctrl}^{RB}, N_{symb-UCI}^{PUCCH}, Q_m, \text{ and } r$$

are defined herein. For PUCCH format 3, if $$M_{RB,min}^{PUCCH}$$

is not equal $2^{\alpha_2} \cdot 3^{\alpha_3} \cdot 5^{\alpha_5}$, $$M_{RB,min}^{PUCCH}$$

is increased to the nearest allowed value of nrofPRBs for PUCCH-format3. If the supportable payload size by using $$M_{RB}^{PUCCH}$$

PRBs is smaller than a payload size for LP and HP HARQ-ACK and a corresponding CRC, the UE does not multiplex LP HARQ-ACK but only transmits HP HARQ-ACK on the PUCCH of higher priority index, where the UE determines a number of PRBs $$M_{RB,min}^{PUCCH}$$

for the PUCCH transmission to be the minimum number of physical resource blocks ("PRBs") that is smaller than or equal to a number of PRBs $$M_{RB}^{PUCCH},$$

taking into account the payload size for only HP HARQ-ACK and a corresponding cyclic redundancy check ("CRC").

In certain embodiments, in shared spectrum channel access (e.g., unlicensed cell) if the PUCCH of LP HARQ-ACK starts earlier than (and overlap with) the PUCCH of HP HARQ-ACK and the beginning of the UE fixed frame period ("FFP") ("UE-FFP") is aligned with the PUCCH of LP HARQ-ACK, the UE initiates a COT upon successful listen before talk ("LBT") in idle period prior to the UE-FFP; the UE is expected to drop the LP PUCCH before the transmission of the HP PUCCH and multiplexes LP and HP HARQ-ACKs in the PUCCH resource of the HP HARQ-ACK. In one example, the dropping of LP PUCCH and multiplexing of LP HARQ-ACK and HP HARQ-ACK is based on the conditions described in various embodiments herein.

In some embodiments (e.g., case 2), there may be separate encoding of low priority HARQ-ACK and high priority HARQ-ACK and/or SR.

In various embodiments, if a UE would transmit HP HARQ-ACK with or without HP SR in a PUCCH of higher priority index that would overlap in time with a transmission of a PUCCH of lower priority index including LP HARQ-ACK, the UE separately encodes HP HARQ-ACK with or without HP SR from LP HARQ-ACK if the PUCCH of lower priority index carrying LP HARQ-ACK is not confined within a first sub-slot (e.g. sub-slot n), where the transmission of the PUCCH of higher priority index occurs (and transmits the PUCCH of higher priority index). Further, the UE may further determine a separate PUCCH resource for LP HARQ-ACK that would not overlap (e.g., in time) with the PUCCH of higher priority index for HP HARQ-ACK and/or SR and performs a separate transmission on the separate PUCCH resource.

For example, the separate PUCCH resource for LP HARQ-ACK is in a second sub-slot (e.g., sub-slot n+x, where x is a positive integer) following the first sub-slot where the transmission of the PUCCH of higher priority index occurs. If the PUCCH of low priority index overlaps with a transmission of another PUCCH of higher priority index for another HP HARQ-ACK and/or SR in the next sub-slot (e.g., sub-slot n+1), a decision of joint encoding and multiplexing (or separate encoding with separate transmission) is based on whether the PUCCH of a lower priority index is confined within the next sub-slot, as described in certain embodiments. In this way, the UE may handle the case that the PUCCH of a lower priority index overlaps in time with more than one PUCCH of a higher priority index.

In certain embodiments, there may be PUCCH resource determination for multiplexed low priority HARQ-ACK and high priority HARQ-ACK and/or SR.

In some embodiments, if a UE is provided with first and second PUCCH-Config (e.g., configured to simultaneously construct two HARQ-ACK codebooks, LP HARQ-ACK codebook associated with the first PUCCH-Config and HP HARQ-ACK codebook associated with the second PUCCH-Config) and if the UE determines multiplexing of LP HARQ-ACK with HP HARQ-ACK and/or HP SR and transmits $O_{UCI}$ information bits corresponding to UCI of mixed priorities, that include LP HARQ-ACK information bits and HP UCI (e.g., HP HARQ-ACK and/or HP SR), the UE determines a PUCCH resource set to be: 1) a first set of PUCCH resources with pucch-ResourceSetId=0 of the second PUCCH-Config if $O_{UCI}{\leq}2$ including 1 or 2 LP and/or HP HARQ-ACK information bits and a positive or negative HP SR on one HP SR transmission occasion (e.g., if simultaneous transmission of HP SR and LP and/or HP HARQ-ACK occur); 2) a second set of PUCCH resources with pucch-ResourceSetId=1 of the second PUCCH-Config, if provided by higher layers, if $2{<}O_{UCI}{\leq}N_2$, where $N_2$ is equal to maxPayloadSize if maxPayloadSize is provided for the PUCCH resource set with pucch-ResourceSetId=1 of the second PUCCH-Config, otherwise $N_2$ is equal to 1706; 3) a third set of PUCCH resources with pucch-ResourceSetId=2 of the second PUCCH-Config, if provided by higher layers, if $N_2{<}O_{UCI}{\leq}N_3$ where $N_3$ is equal to maxPayloadSize if maxPayloadSize is provided for the PUCCH resource set with pucch-ResourceSetId=2, otherwise $N_3$ is equal to 1706; or 4) a fourth set of PUCCH resources with pucch-ResourceSetId=3 of the second PUCCH-Config, if provided by higher layers, if $N_3{<}O_{UCI}{\leq}1706$.

In various embodiments, a UE may be provided with a semi-statically configured PUCCH resource indicator ("PRI") value, which may be used for determining a PUCCH resource among a set of PUCCH resources of a determined PUCCH resource set of a second PUCCH-Config.

In certain embodiments, since a PUCCH resource for transmission of UCI of mixed priorities is selected from a second PUCCH-Config associated with a HP HARQ-ACK codebook, low-latency HP HARQ-ACK feedback, and low-latency HP SR may be guaranteed even when LP HARQ-ACK is multiplexed with HP HARQ-ACK and/or HP SR.

In some embodiments, a UE is provided with a mixedPriorities-PUCCH-List and transmits $O_{UCI}$ UCI information bits that include LP HARQ-ACK information bits and HP UCI including HP HARQ-ACK and/or HP SR. The UE determines a PUCCH resource to be: 1) a PUCCH resource provided by mixedPriorities-PUCCH-ResourceID obtained from a first entry in mixedPriorities-PUCCH-List if $O_{UCI}{\leq}2$; 2) a PUCCH resource provided by mixedPriorities-PUCCH-ResourceID obtained from a second entry in mixedPriorities-PUCCH-List, if provided, if $2{<}O_{UCI}{\leq}N_1$, where $N_1$ is either provided by maxPayloadSize obtained from or associated with the second entry in mixedPriorities-PUCCH-List or is otherwise equal to 1706; 3) a PUCCH resource provided by mixedPriorites-PUCCH-AN-ResourceID obtained from a third entry in mixedPriorities-PUCCH-List, if provided, if $N_1{<}O_{UCI}{\leq}N_2$ where $N_2$ is either provided by maxPayloadSize obtained from or associated with the third entry in mixedPriorities-PUCCH-List or is otherwise equal to 1706; or 4) a PUCCH resource provided by mixedPriorities-PUCCH-AN-ResourceID obtained from or associated with a fourth entry in mixedPriorities-PUCCH-List, if provided, if $N_2{<}O_{UCI}{\leq}N_3$ where $N_3$ is equal to 1706.

In various embodiments, if a UE determines a PUCCH resource of PUCCH format 0 or 1 for transmission of UCI of mixed priorities, LP and/or HP HARQ-ACK bits and additionally HP SR are indicated in a same way that HARQ-ACK bits of the same priority and additionally SR of the same priority are indicated in PUCCH format 0 or 1.

In certain embodiments, there may multiplexing of CSI (e.g., configured in PUCCH), low priority HARQ-ACK, and high priority HARQ-ACK and/or SR in a PUCCH.

In some embodiments, if a UE is provided first and second PUCCH-Config (e.g., configured to simultaneously construct two HARQ-ACK codebooks, LP HARQ-ACK codebook associated with the first PUCCH-Config and HP HARQ-ACK codebook associated with the second PUCCH-Config) and if the first and second PUCCH-Config include the same sub-slot length configuration or both support slot-based HARQ-ACK feedback, a CSI-mixedPriority-PUCCH-ResourceList may be provided by the first PUCCH-Config or by the second PUCCH-Config, and PUCCH-ResourceId in CSI-mixedPriority-PUCCH-ResourceList indicates a corresponding PUCCH resource in a PUCCH-Resource provided by a corresponding PUCCH-Config provided in CSI-mixedPriority-PUCCH-ResourceList. The UE may multiplex low priority UCI including at least CSI configured in PUCCH transmission (e.g., periodic CSI report, semi-persistent CSI report) with HP HARQ-ACK with or without HP SR in a PUCCH resource of PUCCH resources indicated in CSI-mixedPriority-PUCCH-ResourceList. In one example, the UE determines and/or selects the PUCCH resource from the PUCCH resources indicated in CSI-mixedPriority-PUCCH-ResourceList based on a total payload of a multiplexed low priority UCI (e.g., including at least one periodic or semi-persistent CSI report) and HP HARQ-ACK with or without SR.

In various embodiments, if a UE is provided first and second PUCCH-Config (e.g., configured to simultaneously construct two HARQ-ACK codebooks, LP HARQ-ACK codebook associated with the first PUCCH-Config and HP HARQ-ACK codebook associated with the second PUCCH-Config) and if the first and second PUCCH-Config include different sub-slot length configurations or if the first PUCCH-Config supports slot-based HARQ-ACK feedback and the second PUCCH-Config supports sub-slot-based HARQ-ACK feedback, CSI-mixedPriority-PUCCH-ResourceList may be provided by the second PUCCH-Config, and PUCCH-ResourceId in CSI-mixedPriority-PUCCH-ResourceList indicates a corresponding PUCCH resource in PUCCH-Resource provided by the second PUCCH-Config. That is, the UE may be configured with PUCCH resources for multiplexing low priority UCI including at least CSI (e.g., configured in PUCCH) with HP HARQ-ACK and/or SR, which are confined within the configured sub-slot length.

In certain embodiments, if a UE is not provided CSI-mixedPriority-PUCCH-ResourceList, the UE does not multiplex CSI configured in PUCCH (e.g., periodic or semi-persistent CSI report) with HP HARQ-ACK and/or SR.

In a second embodiment, there may be multiplexing of UCI of different priorities in an unlicensed spectrum.

In some embodiments, if a UE is provided with a higher layer parameter mixedUCI-OnHighPUSCH including a beta offset parameter and a scaling parameter, the UE is enabled to multiplex UCI of different priorities into a PUSCH of a high priority index. If a UE is provided with a higher layer parameter mixedUCI-OnLowPUSCH including a beta offset parameter and a scaling parameter, the UE is enabled to multiplex UCI of different priorities into a PUSCH of a low priority index.

In various embodiments, a UE is separately enabled to multiplex UCI of different priorities into a PUSCH of a high priority index if a PUSCH transmission are in a UE-FFP (e.g., a frame period in which the UE initiates a channel occupancy) and if PUSCH transmissions are in a gNB-FFP (a frame period in which the gNB initiates a channel occupancy).

In certain embodiments, if a UE would multiplex HARQ-ACK information in a PUSCH transmission that is configured by a ConfiguredGrantConfig, and includes CG-UCI, the UE multiplexes the HARQ-ACK information in the PUSCH transmission if the UE is provided cg-CG-UCI-Multiplexing; otherwise, the UE does not transmit the PUSCH and multiplexes the HARQ-ACK information in a PUCCH transmission or in another PUSCH transmission.

In one example, CG-UCI is included in the PUSCH transmission if CG-UCI based procedures are enabled (e.g., if the higher layer parameter cg-RetransmissionTimer-r16 is configured or if another higher-layer parameter enables CG-UCI to be included in the PUSCH transmission).

In some embodiments, if a UE would transmit LP HARQ-ACK information in a PUCCH of a lower priority index that would overlap in time with a transmission of a configured grant ("CG") PUSCH of a higher priority index, where the CG PUSCH includes CG-UCI and may further include HP HARQ-ACK information if a higher layer parameter cg-CG-UCI-Multiplexing is configured, the UE multiplexes CG-UCI, HP HARQ-ACK information (e.g., if included), and LP HARQ-ACK information in the CG PUSCH of a higher priority index as described in a first method, a second method, and/or a third method.

A first method may jointly encode CG-UCI and HP HARQ-ACK information and separately encode LP HARQ-ACK information. In the first method, for allocating resource elements of the CG PUSCH, coded bits of CG-UCI and HP HARQ-ACK information are prioritized over coded bits of LP HARQ-ACK information. Further, the number of coded modulation symbols per layer for CG-UCI and HP HARQ-ACK are determined based on a maximum allowed number of resource elements equal to a scaled (e.g., based on the configured and/or provided scaling parameter in mixedUCI-OnHighPUSCH) total number of resource elements that may be used for transmission of UCI. The number of coded modulation symbols per layer for CG-UCI and HP HARQ-ACK may be based on the spectral efficiency (e.g., bits and/or symbol or bits and/or resource elements) of the CG PUSCH and the configured and/or provided beta offset in mixedUCI-OnHighPUSCH. Further, the number of coded modulation symbols per layer for LP HARQ-ACK may be determined based on the maximum allowed number of resource elements, which is equal to the scaled total number of resource elements that can be used for transmission of UCI with the subtraction of the number of coded modulation symbols per layer for HP HARQ-ACK and CG-UCI transmission. The same scaling parameter is used as in a previous step, while the beta offset parameter may be the same or different than that used in the previous step. In one example, the UE uses the beta offset parameter and the scaling parameter provided in mixedUCI-OnHighPUSCH. In another example, the UE may be provided with a parameter lp-UCI-OnHighPUSCH including the beta offset parameter to use, and the scaling parameter provided in mixedUCI-OnHighPUSCH is used to determine the total number of resource elements that can be used for transmission of UCI.

A second method may jointly encode CG-UCI, HP HARQ-ACK information, and LP HARQ-ACK information. In the second method, for allocating resource elements of the CG PUSCH, coded bits of CG-UCI, HP HARQ-ACK information, and LP HARQ-ACK information are prioritized over coded bits of other UCI such as CSI-part1 and CSI-part2. Moreover, the number of coded modulation symbols per layer for CG-UCI, HP HARQ-ACK, and LP HARQ-ACK is determined based on the maximum allowed number of resource elements equal to a scaled total number of resource elements that may be used for transmission of UCI. In one example, the UE uses the beta offset parameter and the scaling parameter provided in mixedUCI-OnHigh-PUSCH. Further, the UE may use this method when a COT sharing information bit field of CG-UCI does not exist and, accordingly, CG-UCI payload is small (e.g., higher layer parameter ULtoDL-CO-SharingED-Threshold-r16 is not configured and higher layer parameter cg-COT-SharingOffset-r16 is not configured).

A third method may separately encode CG-UCI and jointly encode HP HARQ-ACK information and LP HARQ-ACK information (e.g., CG-UCI and HARQ-ACK (e.g., LP and additionally HP if included) are separately encoded).

In a first embodiment of the third method, for allocating resource elements of the CG PUSCH, coded bits of HP HARQ-ACK and LP HARQ-ACK information are prioritized over coded bits of CG-UCI. The number of coded modulation symbols per layer for HP HARQ-ACK and LP HARQ-ACK is determined based on the maximum allowed number of resource elements equal to a scaled total number of resource elements that can be used for transmission of UCI. In one example, the UE uses the beta offset parameter and the scaling parameter provided in mixedUCI-OnHigh-PUSCH. The number of coded modulation symbols per layer for CG-UCI is determined based on the maximum allowed number of resource elements, which is equal to the scaled total number of resource elements that can be used for transmission of UCI with the subtraction of the number of coded modulation symbols per layer for HP HARQ-ACK and LP HARQ-ACK transmission. The same scaling parameter is used as in the previous step, while the beta offset parameter may be same or different than that used in the previous step. In one example, the UE uses the beta offset parameter and the scaling parameter provided in mixedUCI-OnHighPUSCH. In another example, the UE may be provided with a parameter cg-UCI-OnHighPUSCH including the beta offset parameter to use, and the scaling parameter provided in mixedUCI-OnHighPUSCH is used to determine the total number of resource elements that can be used for transmission of UCI. The UE may use this embodiment if a COT sharing information bit field of CG-UCI does not exist (e.g., higher layer parameter ULtoDL-CO-SharingED-Threshold-r16 is not configured and higher layer parameter cg-COT-SharingOffset-r16 is not configured).

In a second embodiment of the third method, for allocating resource elements of the CG PUSCH, coded bits of CG-UCI are prioritized over coded bits of HP HARQ-ACK and LP HARQ-ACK information. The number of coded modulation symbols per layer for CG-UCI is determined based on the maximum allowed number of resource elements equal to a scaled total number of resource elements that can be used for transmission of UCI. In one example, the UE uses the beta offset parameter and the scaling parameter provided in mixedUCI-OnHighPUSCH. In another example, the UE uses the beta offset parameter and the scaling parameter provided in cg-UCI-OnHighPUSCH. In a fourth example, the UE uses the beta offset parameter and provided in cg-UCI-OnHighPUSCH and the scaling parameter in mixedUCI-OnHighPUSCH. Moreover, the number of coded modulation symbols per layer for HP HARQ-ACK and LP HARQ-ACK is determined based on the maximum allowed number of resource elements, which is equal to the scaled total number of resource elements that can be used for transmission of UCI with the subtraction of the number of coded modulation symbols per layer for CG-UCI transmission. The same scaling parameter is used as in the previous step, while the beta offset parameter may be the same or different than that used in the previous step. In one example, the UE uses the beta offset parameter and the scaling parameter provided in mixedUCI-OnHigh-PUSCH. In another example, the UE uses the scaling parameter in cg-UCI-OnHighPUSCH and beta offset parameter and provided in mixedUCI-OnHighPUSCH. The UE may use this alternative, if a COT sharing information bit field of CG-UCI exists (e.g., when higher layer parameter ULtoDL-CO-SharingED-Threshold-r16 and higher layer parameter cg-COT-SharingList-r16 are configured, or when higher layer parameter ULtoDL-CO-SharingED-Threshold-r16 is not configured and higher layer parameter cg-COT-SharingOffset-r16 is configured).

In a second embodiment of the third method, a UE may use this method (e.g., separate encoding of CG-UCI from LP and/or HP HARQ-ACK) if a COT sharing information bit field of CG-UCI exists (e.g., when higher layer parameter ULtoDL-CO-SharingED-Threshold-r16 and higher layer parameter cg-COT-SharingList-r16 are configured, or when higher layer parameter ULtoDL-CO-SharingED-Threshold-r16 is not configured and higher layer parameter cg-COT-SharingOffset-r16 is configured). Furthermore, for allocating resource elements of the CG PUSCH, coded bits of HP HARQ-ACK and LP HARQ-ACK information are prioritized over coded bits of CG-UCI.

In one example, if the PUSCH transmission corresponds to a UE initiated channel occupancy ("CO"), and if the CO is shared with a gNB, the UE only multiplexes CG-UCI and HP HARQ-ACK in the CG-PUSCH. One motivation may be by sharing the CO with gNB, and there may be further opportunities to transmit the LP HARQ-ACK.

In another example, if the first symbol of the PUCCH of a lower priority index occurs after the first symbol of the PUSCH if the first symbol of the PUSCH transmission is aligned with a UE-FFP boundary, a UE may not multiplex LP HARQ-ACK information in the PUSCH or may separately encode CG-UCI and LP HARQ-ACK.

In a first set of embodiments, if the HP HARQ-ACK information is not included in the transmission (e.g., no HP HARQ-ACK or HP HARQ-ACK not available to multiplex (e.g., HP HARQ-ACK UCI multiplexing timeline condition not met) in the transmission) of the CG PUSCH of a higher priority index different embodiments may include different methods.

In a first method of the first set of embodiments, a CG-UCI and LP HARQ-ACK information may be encoded separately. For allocating resource elements of the CG PUSCH, coded bits of CG-UCI are prioritized over coded bits of LP HARQ-ACK information. The number of coded modulation symbols per layer for CG-UCI is determined based on the maximum allowed number of resource elements equal to a scaled total number of resource elements that can be used for transmission of UCI. In one example, the UE uses the beta offset parameter and the scaling parameter provided in mixedUCI-OnHighPUSCH. In another example, the UE uses the beta offset parameter and the scaling parameter provided in cg-UCI-OnHighPUSCH. In a further example, the UE uses the beta offset parameter and provided in cg-UCI-OnHighPUSCH and the scaling parameter in mixedUCI-OnHighPUSCH. Moreover, the number of coded modulation symbols per layer for LP HARQ-ACK is determined based on the maximum allowed number of resource elements, which is equal to the scaled total number of resource elements that can be used for transmission of UCI with the subtraction of the number of coded modulation symbols per layer for CG-UCI transmission. The same scaling parameter is used as in the previous step, while the beta offset parameter may be same or different than that used in the previous step. In another example, the UE may be provided with a parameter lp-UCI-OnHighPUSCH including the beta offset parameter for LP HARQ-ACK.

In a second method of the first set of embodiments, CG-UCI and LP HARQ-ACK information may be jointly included. The number of coded modulation symbols per layer for CG-UCI and LP HARQ-ACK is determined based on the scaled total number of resource elements that can be used for transmission of UCI. In one example, the UE uses the beta offset parameter and the scaling parameter provided in a mixedUCI-OnHighPUSCH. In another example, the UE may be provided with a parameter lp-UCI-OnHighPUSCH including the beta offset parameter and the scaling parameter. Moreover, the UE may use this method if a COT sharing information bit field of CG-UCI does not exist and, accordingly, a CG-UCI payload is small (e.g., higher layer parameter ULtoDL-CO-SharingED-Threshold-r16 is not configured and higher layer parameter cg-COT-SharingOffset-r16 is not configured).

In various embodiments, a UE is enabled to multiplex LP HARQ-ACK information into a CG PUSCH of a higher priority index with CG-UCI if the higher layer parameter cg-CG-UCI-Multiplexing is configured (e.g., if multiplexing of HP HARQ-ACK information on the CG PUSCH of the higher priority index is enabled).

In certain embodiments, a UE is enabled to multiplex LP HARQ-ACK information into a CG PUSCH of a higher priority index with CG-UCI if a separate higher layer parameter cg-CG-UCI-Multiplexing-mixedPriority is configured.

In a second set of embodiments, if a UE would transmit HP HARQ-ACK information in a PUCCH of a higher priority index that would overlap in time with a transmission of a CG PUSCH of a lower priority index, where the CG PUSCH includes CG-UCI and may further include LP HARQ-ACK information if a higher layer parameter cg-CG-UCI-Multiplexing is configured, the UE multiplexes CG-UCI, LP HARQ-ACK information (e.g., if included), and HP HARQ-ACK information in the CG PUSCH of lower priority index as found in a first method, a second method, and/or a third method.

In a first method of the second set of embodiments, CG-UCI and LP HARQ-ACK information (e.g., if included) may be jointly encoded and separately encode HP HARQ-ACK information. For allocating resource elements of the CG PUSCH, coded bits of HP HARQ-ACK information are prioritized over coded bits of LP HARQ-ACK information and CG-UCI. The number of coded modulation symbols per layer for HP HARQ-ACK is determined based on the maximum allowed number of resource elements equal to a scaled (e.g., based on the configured and/or provided scaling parameter in mixedUCI-OnLowPUSCH) total number of resource elements that can be used for transmission of UCI. The number of coded modulation symbols per layer for HP HARQ-ACK may be based on the spectral efficiency (e.g., bits and/or symbol or bits and/or resource element) of the CG PUSCH and the configured and/or provided beta offset in mixedUCI-OnLowPUSCH. In one example, the UE may be provided with a parameter hp-UCI-OnLowPUSCH including the beta offset parameter to use. The number of coded modulation symbols per layer for LP HARQ-ACK and CG-UCI is determined based on the maximum allowed number of resource elements, which is equal to the scaled total number of resource elements that can be used for transmission of UCI with the subtraction of the number of coded modulation symbols per layer for HP HARQ-ACK transmission. The same scaling parameter is used as in the previous step, while the beta offset parameter may be same or different than that used in the previous step. In one example, the UE uses the beta offset parameter and the scaling parameter provided in mixedUCI-OnLowPUSCH while using the beta offset parameter provided in hp-UCI-OnLowPUSCH and the scaling parameter provided in mixedUCI-OnHighPUSCH in the previous step.

In a second method of the second set of embodiments, CG-UCI, HP HARQ-ACK information, and LP HARQ-ACK (e.g., if included) information may be jointly encoded. For allocating resource elements of the CG PUSCH, coded bits of CG-UCI, HP HARQ-ACK information, and LP HARQ-ACK information are prioritized over coded bits of other UCI such as CSI-part1 and CSI-part2. The number of coded modulation symbols per layer for CG-UCI, HP HARQ-ACK, and LP HARQ-ACK is determined based on the maximum allowed number of resource elements equal to a scaled total number of resource elements that can be used for transmission of UCI. In one example, the UE uses the beta offset parameter and the scaling parameter provided in mixedUCI-OnLowPUSCH. The UE may use this method when a COT sharing information bit field of CG-UCI is not configured and accordingly CG-UCI payload is small.

In a third method of the second set of embodiments, CG-UCI may be separately encoded and HP HARQ-ACK information and LP HARQ-ACK information (e.g., CG-UCI and HARQ-ACK (HP and additionally LP if included) are separately encoded) may be jointly encoded. For allocating resource elements of the CG PUSCH, coded bits of HP HARQ-ACK and LP HARQ-ACK information are prioritized over coded bits of CG-UCI. The number of coded modulation symbols per layer for HP HARQ-ACK and LP HARQ-ACK is determined based on the maximum allowed number of resource elements equal to a scaled total number of resource elements that can be used for transmission of UCI. In one example, the UE uses the beta offset parameter and the scaling parameter provided in mixedUCI-OnLow-PUSCH. The number of coded modulation symbols per layer for CG-UCI is determined based on the maximum allowed number of resource elements, which is equal to the scaled total number of resource elements that can be used for transmission of UCI with the subtraction of the number of coded modulation symbols per layer for HP HARQ-ACK and LP HARQ-ACK transmission. The same scaling parameter is used as in the previous step, while the beta offset parameter may be the same or different than that used in the previous step. In one example, the UE uses the beta offset parameter and the scaling parameter provided in mixedUCI-OnHighPUSCH. In another example, the UE may be provided with a parameter cg-UCI-OnLowPUSCH including the beta offset parameter to use. The scaling parameter provided in mixedUCI-OnLowPUSCH is used to determine the total number of resource elements that can be used for transmission of UCI.

In certain embodiments, there may be procedures for a UE to multiplex UCI of different priorities in a PUCCH or PUSCH.

Moreover, in the first embodiment, there may be a UE procedure for multiplexing UCI of different priorities in PUCCH. If a UE would transmit HP HARQ-ACK with or without HP SR in a PUCCH of higher priority index that would overlap in time with a transmission of a PUCCH of lower priority index including LP HARQ-ACK, the UE jointly encodes HP HARQ-ACK with or without HP SR with LP HARQ-ACK if the PUCCH of lower priority index is confined within a sub-slot where the transmission of the PUCCH of higher priority index occurs. Further, the UE determines whether to multiplex the LP HARQ-ACK based on whether the total payload is less than a supportable payload based on configured parameters of the maximum code rate and the maximum number of PRBs of a given PUCCH format. If the PUCCH of lower priority index is not confined within the sub-slot, a separate PUCCH resource for LP HARQ-ACK that would not overlap in time with the PUCCH of higher priority index is determined in a following sub-slot.

Further, in the second embodiment, there may be multiplexing of UCI of different priorities and CG-UCI in CG PUSCH. In such embodiments, various methods to multiplex CG-UCI, HP HARQ-ACK information, and LP HARQ-ACK information in CG PUSCH of a higher priority index are used.

In one method, joint encoding of CG-UCI with HP and/or LP HARQ-ACK is enabled if a COT sharing information bit field of CG-UCI does not exist and accordingly a CG-UCI payload is small. Otherwise, coded bits of HP and/or LP HARQ-ACK are prioritized over coded bits of CG-UCI for resource allocation within CG-PUSCH. In another method, GC-UCI is always separately encoded from HP and/or LP HARQ-ACK, and resource allocation priority of GC-UCI over HP and/or LP HARQ-ACK is determined based on existence of a COT sharing information bit field in CG-UCI.

In some embodiments, such as in 3GPP Rel-16 NR, if a UE would transmit a PUCCH or PUSCH of a higher priority index that fully or partially overlaps with transmission of a PUCCH or PUSCH of a lower priority index, the UE cancels the transmission of the PUCCH or PUSCH of the lower priority index. This may lead to cancellation of HARQ-ACK feedback with LP HARQ-ACK information, and frequent cancellation of HARQ-ACK feedback may cause DL throughput degradation for low priority DL packets (e.g., eMBB traffics).

It should be noted that the first embodiment may guarantee a target code rate of HP HARQ-ACK and/or SR by selectively multiplexing LP HARQ-ACK in PUCCH based on an aggregated payload size of HP and/or LP HARQ-ACK. Further, low latency HARQ-ACK feedback for HP HARQ-ACK and low latency SR for HP SR is guaranteed, as a PUCCH resource for transmission of UCI of mixed priorities is selected from the second PUCCH-Config associated with a HP HARQ-ACK codebook.

Further, it should be noted that the second embodiment may guarantee a target code rate of HP and/or LP HARQ-ACK by selectively enabling joint encoding with CG-UCI based on configuration of a CG-UCI field.

In various embodiments, a method in a UE comprises: determining a first transmission of first UCI on a first PUCCH of a first priority; determining a second transmission of second UCI on a second PUCCH of a second priority; determining whether a latest symbol of the second PUCCH is within a sub-slot where a latest symbol of the first PUCCH is; and determining whether to multiplex the second UCI with the first UCI in a third PUCCH, based on the determination whether the latest symbol of the second PUCCH is within the sub-slot where the latest symbol of the first PUCCH is, wherein the first PUCCH of the first priority overlaps in time with the second PUCCH of the second priority, and the first priority is different from the second priority.

In certain embodiments, the first priority is higher than the second priority.

In some embodiments, the second UCI comprises at least one selected from low priority HARQ-ACK information and at least one CSI report, where the at least one CSI report is a periodic or semi-persistent report.

In various embodiments, the first UCI comprises at least one selected from high priority HARQ-ACK information and high priority SR.

In certain embodiments, the first PUCCH and third PUCCH are configured by a first PUCCH configuration and the second PUCCH is configured by a second PUCCH configuration.

In some embodiments, the method may further comprise: receiving an indication of a list of PUCCH resources to be used for transmission of UCI of mixed priorities, and selecting the third PUCCH resource from the list of PUCCH resources.

In various embodiments, determining whether to multiplex the second UCI with the first UCI in the third PUCCH further comprises determining based on a size of a payload comprising the first UCI, the second UCI, and a CRC.

In certain embodiments, multiplexing of the second UCI with the first UCI in the third PUCCH is determined, when the size of the payload is less than a maximum payload size being determined based on a maximum code rate and a maximum number of PRBs of the third PUCCH.

In some embodiments, the method further comprises performing the first transmission of the first UCI on the first PUCCH of the first priority and cancelling the second transmission of the second UCI on the second PUCCH of the second priority, when determined not to multiplex.

In various embodiments, the method further comprises performing a third transmission of the first UCI and the second UCI on the third PUCCH of the first priority.

Figure 4:
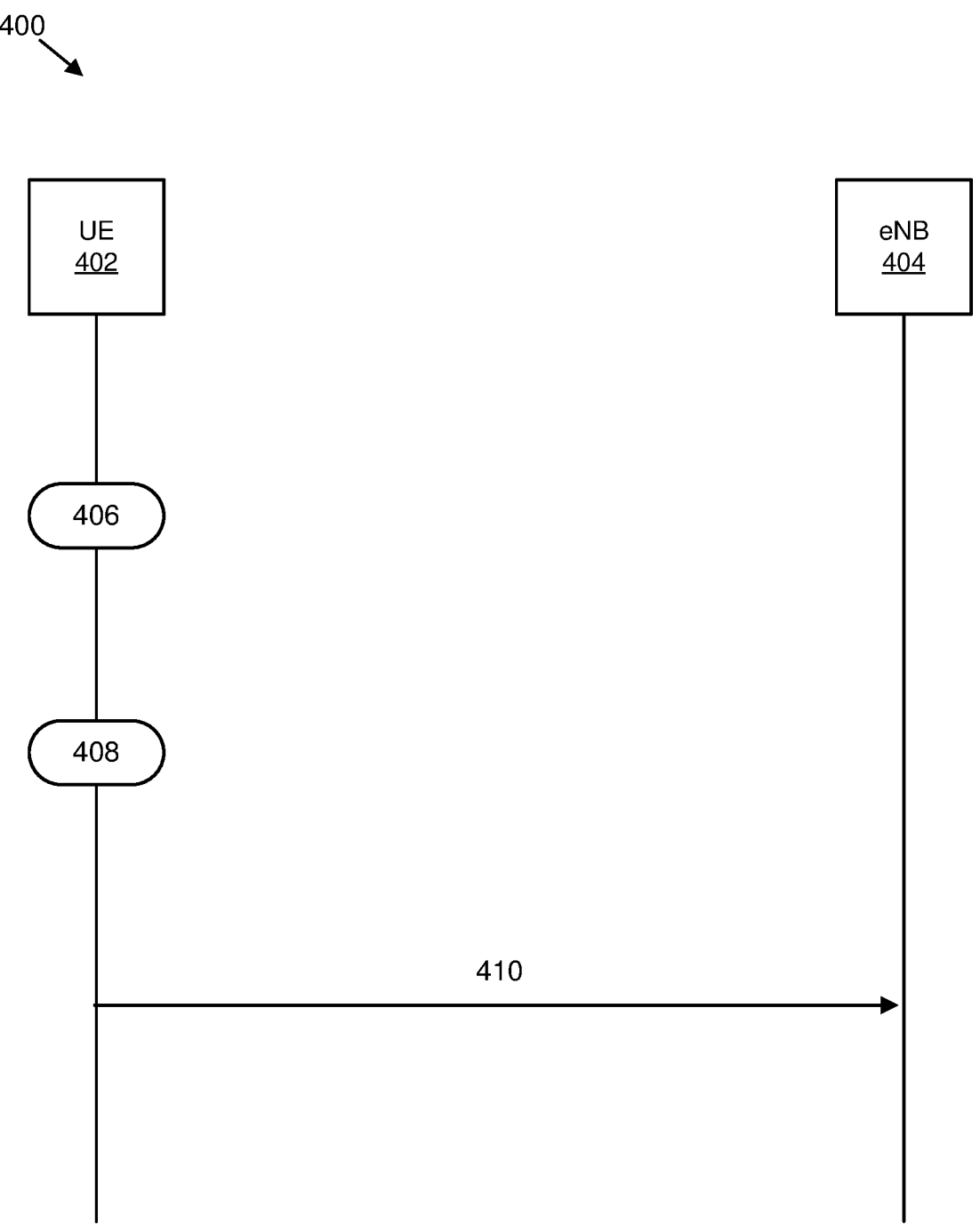
FIG. 4 is a schematic block diagram illustrating one embodiment of a system for multiplexing uplink control information of different priorities.

FIG. 4 is a schematic block diagram illustrating one embodiment of a system 400 for multiplexing uplink control information of different priorities. The system 400 includes a UE 402 and an eNB 404. Each of the communications of the system 400 include one or more messages.

The UE 402 may determine 406 a first transmission of first UCI on a first PUCCH of a first priority. The first PUCCH is based on a first PUCCH configuration. Moreover, the UE 402 may determine 408 a second transmission of second UCI on a second PUCCH of a second priority. The second PUCCH is based on a second PUCCH configuration. In a first communication 410, in response to determining that the first PUCCH of the first priority overlaps in time with the second PUCCH of the second priority, the UE 402 multiplexes at least part of the first UCI with the second UCI on a third PUCCH of the second priority. The third PUCCH is based on the second PUCCH configuration. Moreover, the second priority is higher than the first priority.

FIG. 5 is a flow chart diagram illustrating one embodiment of a method 500 for multiplexing uplink control information of different priorities. In some embodiments, the method 500 is performed by an apparatus, such as the remote unit 102. In certain embodiments, the method 500 may be performed by a processor executing program code, for example, a microcontroller, a microprocessor, a CPU, a GPU, an auxiliary processing unit, a FPGA, or the like.

In various embodiments, the method 500 includes determining 502, at a user equipment, a first transmission of first uplink control information (UCI) on a first physical uplink control channel (PUCCH) of a first priority, the first PUCCH being based on a first PUCCH configuration. In some embodiments, the method 500 includes determining 504 a second transmission of second UCI on a second PUCCH of a second priority, the second PUCCH being based on a second PUCCH configuration. In certain embodiments, the method 500 includes, in response to determining that the first PUCCH of the first priority overlaps in time with the second PUCCH of the second priority, multiplexing 506 at least part of the first UCI with the second UCI on a third PUCCH of the second priority, the third PUCCH being based on the second PUCCH configuration. The second priority is higher than the first priority.

In certain embodiments, the method 500 further comprises constructing a first hybrid automatic repeat request (HARQ) acknowledgement (ACK) (HARQ-ACK) codebook corresponding to the first PUCCH configuration and a second HARQ-ACK codebook corresponding to the second PUCCH configuration, wherein the at least part of first UCI comprises the first HARQ-ACK codebook and the second UCI comprises the second HARQ-ACK codebook. In some embodiments, the first HARQ-ACK codebook is low priority (LP) HARQ-ACK information and the second HARQ-ACK codebook is high priority (HP) HARQ-ACK information. In various embodiments, multiplexing the at least part of the first UCI with the second UCI on the third PUCCH of the second priority comprises encoding the LP HARQ-ACK information separately from encoding the HP HARQ-ACK information.

In one embodiment, a plurality of PUCCH resources of the first PUCCH configuration are of the first priority, and a plurality of PUCCH resources of the second PUCCH configuration are of the second priority. In certain embodiments, the second UCI comprises HP HARQ-ACK information, at least one HP scheduling request (SR), or a combination thereof. In some embodiments, the method 500 further comprises selecting a PUCCH resource set from at least one PUCCH resource set configured in the second PUCCH configuration based on a size of the at least part of the first UCI and a size of the second UCI.

In various embodiments, the method 500 further comprises multiplexing the at least part of the first UCI with the second UCI into a physical uplink shared channel (PUSCH), when the third PUCCH of the second priority overlaps in time with the PUSCH. In one embodiment, the PUSCH corresponds to a configured grant (CG) PUSCH, wherein the CG PUSCH comprises CG UCI. In certain embodiments, the method 500 further comprises encoding first HARQ-ACK information of the at least part of the first UCI, second HARQ-ACK information of the second UCI, and the CG UCI jointly.

In some embodiments, the method 500 further comprises: encoding first HARQ-ACK information of the at least part of the first UCI jointly with the CG UCI and separately encoding second HARQ-ACK information of the second UCI, when the CG PUSCH is of the first priority; and encoding the second HARQ-ACK information of the second UCI jointly with the CG UCI and separately encoding the first HARQ-ACK information of the at least part of the first UCI, when the CG PUSCH is of the second priority. In various embodiments, the method 500 further comprises: determining a first number of coded modulation symbols per layer for the second HARQ-ACK information based on a scaled total number of resource elements to be used for transmission of UCI; and determining a second number of coded modulation symbols per layer for the first HARQ-ACK information and the CG UCI based on the scaled total number of resource elements to be used for transmission of UCI minus the first number of coded modulation symbols per layer for the second HARQ-ACK information, wherein the CG PUSCH is of the first priority.

In one embodiment, the method 500 further comprises: determining a first number of coded modulation symbols per layer for the second HARQ-ACK information and the CG UCI based on a scaled total number of resource elements to be used for transmission of UCI; and determining a second number of coded modulation symbols per layer for the first HARQ-ACK information based on the scaled total number of resource elements to be used for transmission of UCI minus the first number of coded modulation symbols per layer for the second HARQ-ACK information and the CG UCI, wherein the CG PUSCH is of the second priority. In certain embodiments, the method 500 further comprises determining whether to multiplex the at least part of the first UCI with the second UCI.

Figure 6:
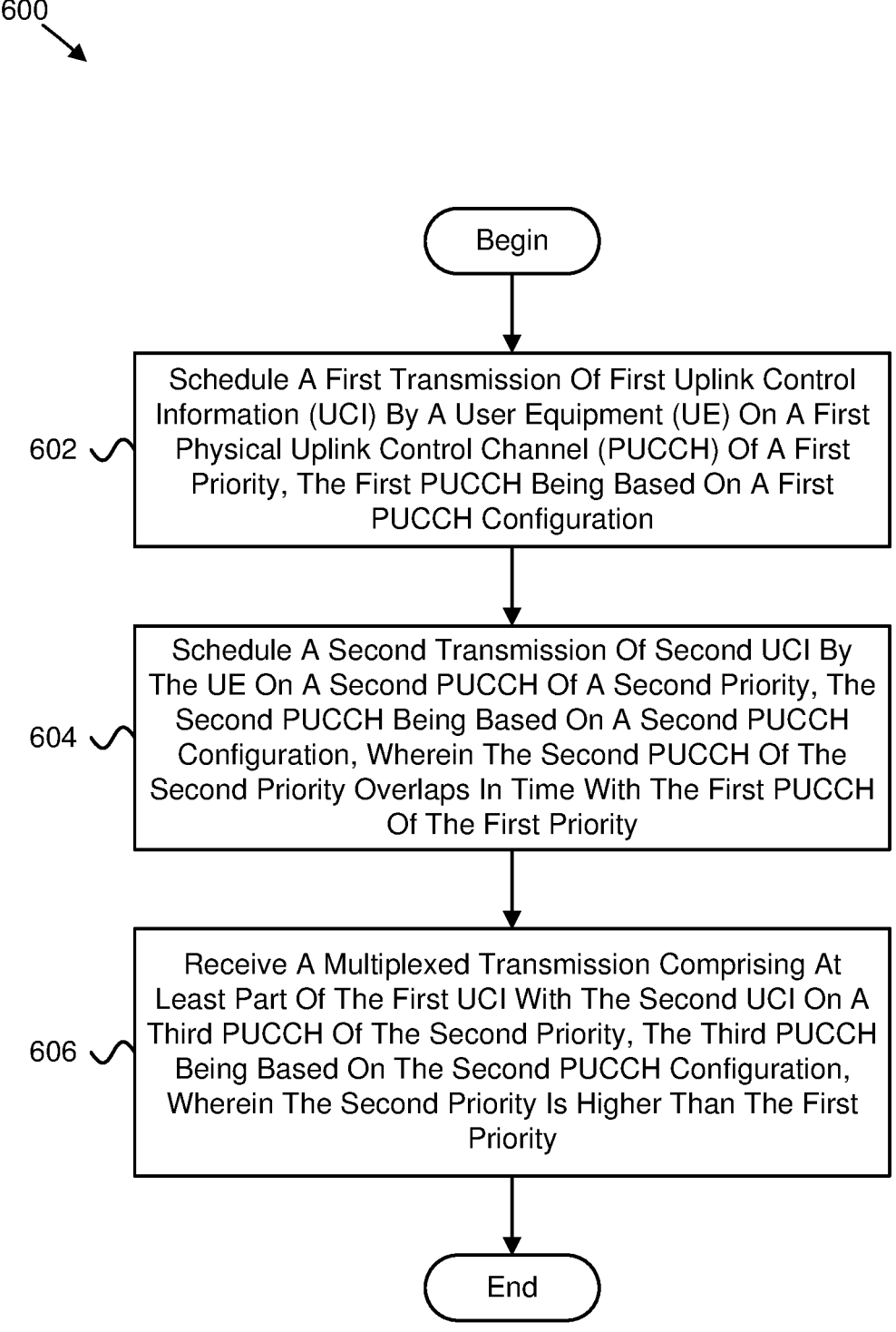
FIG. 6 is a flow chart diagram illustrating another embodiment of a method for multiplexing uplink control information of different priorities.

FIG. 6 is a flow chart diagram illustrating another embodiment of a method 600 for multiplexing uplink control information of different priorities. In some embodiments, the method 600 is performed by an apparatus, such as the network unit 104. In certain embodiments, the method 600 may be performed by a processor executing program code, for example, a microcontroller, a microprocessor, a CPU, a GPU, an auxiliary processing unit, a FPGA, or the like.

In various embodiments, the method 600 includes scheduling 602, at a network device, a first transmission of first uplink control information (UCI) by a user equipment (UE) on a first physical uplink control channel (PUCCH) of a first priority, the first PUCCH being based on a first PUCCH configuration. In some embodiments, the method 600 includes scheduling 604 a second transmission of second UCI by the UE on a second PUCCH of a second priority, the second PUCCH being based on a second PUCCH configuration. The second PUCCH of the second priority overlaps in time with the first PUCCH of the first priority. In certain embodiments, the method 600 includes receiving 606 a multiplexed transmission comprising at least part of the first UCI with the second UCI on a third PUCCH of the second priority, the third PUCCH being based on the second PUCCH configuration. The second priority is higher than the first priority.

In certain embodiments, a plurality of PUCCH resources of the first PUCCH configuration are of the first priority, and a plurality of PUCCH resources of the second PUCCH configuration are of the second priority. In some embodiments, the second UCI comprises HP HARQ-ACK information, at least one HP scheduling request (SR), or a combination thereof.

In one embodiment, a method of a user equipment (UE) comprises: determining a first transmission of first uplink control information (UCI) on a first physical uplink control channel (PUCCH) of a first priority, the first PUCCH being based on a first PUCCH configuration; determining a second transmission of second UCI on a second PUCCH of a second priority, the second PUCCH being based on a second PUCCH configuration; and in response to determining that the first PUCCH of the first priority overlaps in time with the second PUCCH of the second priority, multiplexing at least part of the first UCI with the second UCI on a third PUCCH of the second priority, the third PUCCH being based on the second PUCCH configuration, wherein the second priority is higher than the first priority.

In certain embodiments, the method further comprises constructing a first hybrid automatic repeat request (HARQ) acknowledgement (ACK) (HARQ-ACK) codebook corresponding to the first PUCCH configuration and a second HARQ-ACK codebook corresponding to the second PUCCH configuration, wherein the at least part of first UCI comprises the first HARQ-ACK codebook and the second UCI comprises the second HARQ-ACK codebook.

In some embodiments, the first HARQ-ACK codebook is low priority (LP) HARQ-ACK information and the second HARQ-ACK codebook is high priority (HP) HARQ-ACK information.

In various embodiments, multiplexing the at least part of the first UCI with the second UCI on the third PUCCH of the second priority comprises encoding the LP HARQ-ACK information separately from encoding the HP HARQ-ACK information.

In one embodiment, a plurality of PUCCH resources of the first PUCCH configuration are of the first priority, and a plurality of PUCCH resources of the second PUCCH configuration are of the second priority.

In certain embodiments, the second UCI comprises HP HARQ-ACK information, at least one HP scheduling request (SR), or a combination thereof.

In some embodiments, the method further comprises selecting a PUCCH resource set from at least one PUCCH resource set configured in the second PUCCH configuration based on a size of the at least part of the first UCI and a size of the second UCI.

In various embodiments, the method further comprises multiplexing the at least part of the first UCI with the second UCI into a physical uplink shared channel (PUSCH), when the third PUCCH of the second priority overlaps in time with the PUSCH.

In one embodiment, the PUSCH corresponds to a configured grant (CG) PUSCH, wherein the CG PUSCH comprises CG UCI.

In certain embodiments, the method further comprises encoding first HARQ-ACK information of the at least part of the first UCI, second HARQ-ACK information of the second UCI, and the CG UCI jointly.

In some embodiments, the method further comprises: encoding first HARQ-ACK information of the at least part of the first UCI jointly with the CG UCI and separately encoding second HARQ-ACK information of the second UCI, when the CG PUSCH is of the first priority; and encoding the second HARQ-ACK information of the second UCI jointly with the CG UCI and separately encoding the first HARQ-ACK information of the at least part of the first UCI, when the CG PUSCH is of the second priority.

In various embodiments, the method further comprises: determining a first number of coded modulation symbols per layer for the second HARQ-ACK information based on a scaled total number of resource elements to be used for transmission of UCI; and determining a second number of coded modulation symbols per layer for the first HARQ-ACK information and the CG UCI based on the scaled total number of resource elements to be used for transmission of UCI minus the first number of coded modulation symbols per layer for the second HARQ-ACK information, wherein the CG PUSCH is of the first priority.

In one embodiment, the method further comprises: determining a first number of coded modulation symbols per layer for the second HARQ-ACK information and the CG UCI based on a scaled total number of resource elements to be used for transmission of UCI; and determining a second number of coded modulation symbols per layer for the first HARQ-ACK information based on the scaled total number of resource elements to be used for transmission of UCI minus the first number of coded modulation symbols per layer for the second HARQ-ACK information and the CG UCI, wherein the CG PUSCH is of the second priority.

In certain embodiments, the method further comprises determining whether to multiplex the at least part of the first UCI with the second UCI.

In one embodiment, an apparatus comprises a user equipment (UE). The apparatus further comprises: a processor that: determines a first transmission of first uplink control information (UCI) on a first physical uplink control channel (PUCCH) of a first priority, the first PUCCH being based on a first PUCCH configuration; determines a second transmission of second UCI on a second PUCCH of a second priority, the second PUCCH being based on a second PUCCH configuration; and, in response to determining that the first PUCCH of the first priority overlaps in time with the second PUCCH of the second priority, multiplexes at least part of the first UCI with the second UCI on a third PUCCH of the second priority, the third PUCCH being based on the second PUCCH configuration, wherein the second priority is higher than the first priority.

In certain embodiments, the processor constructs a first hybrid automatic repeat request (HARQ) acknowledgement (ACK) (HARQ-ACK) codebook corresponding to the first PUCCH configuration and a second HARQ-ACK codebook corresponding to the second PUCCH configuration, wherein the at least part of first UCI comprises the first HARQ-ACK codebook and the second UCI comprises the second HARQ-ACK codebook.

In some embodiments, the first HARQ-ACK codebook is low priority (LP) HARQ-ACK information and the second HARQ-ACK codebook is high priority (HP) HARQ-ACK information.

In various embodiments, the processor multiplexing the at least part of the first UCI with the second UCI on the third PUCCH of the second priority comprises the processor encoding the LP HARQ-ACK information separately from encoding the HP HARQ-ACK information.

In one embodiment, a plurality of PUCCH resources of the first PUCCH configuration are of the first priority, and a plurality of PUCCH resources of the second PUCCH configuration are of the second priority.

In certain embodiments, the second UCI comprises HP HARQ-ACK information, at least one HP scheduling request (SR), or a combination thereof.

In some embodiments, the processor selects a PUCCH resource set from at least one PUCCH resource set configured in the second PUCCH configuration based on a size of the at least part of the first UCI and a size of the second UCI.

In various embodiments, the processor multiplexes the at least part of the first UCI with the second UCI into a physical uplink shared channel (PUSCH), when the third PUCCH of the second priority overlaps in time with the PUSCH.

In one embodiment, the PUSCH corresponds to a configured grant (CG) PUSCH, wherein the CG PUSCH comprises CG UCI.

In certain embodiments, the processor encodes first HARQ-ACK information of the at least part of the first UCI, second HARQ-ACK information of the second UCI, and the CG UCI jointly.

In some embodiments, the processor: encodes first HARQ-ACK information of the at least part of the first UCI jointly with the CG UCI and separately encoding second HARQ-ACK information of the second UCI, when the CG PUSCH is of the first priority; and encodes the second HARQ-ACK information of the second UCI jointly with the CG UCI and separately encoding the first HARQ-ACK information of the at least part of the first UCI, when the CG PUSCH is of the second priority.

In various embodiments, the processor: determines a first number of coded modulation symbols per layer for the second HARQ-ACK information based on a scaled total number of resource elements to be used for transmission of UCI; and determines a second number of coded modulation symbols per layer for the first HARQ-ACK information and the CG UCI based on the scaled total number of resource elements to be used for transmission of UCI minus the first number of coded modulation symbols per layer for the second HARQ-ACK information, wherein the CG PUSCH is of the first priority.

In one embodiment, the processor: determines a first number of coded modulation symbols per layer for the second HARQ-ACK information and the CG UCI based on a scaled total number of resource elements to be used for transmission of UCI; and determines a second number of coded modulation symbols per layer for the first HARQ-ACK information based on the scaled total number of resource elements to be used for transmission of UCI minus the first number of coded modulation symbols per layer for the second HARQ-ACK information and the CG UCI, wherein the CG PUSCH is of the second priority.

In certain embodiments, the processor determines whether to multiplex the at least part of the first UCI with the second UCI.

In one embodiment, a method of a network device comprises: scheduling a first transmission of first uplink control information (UCI) by a user equipment (UE) on a first physical uplink control channel (PUCCH) of a first priority, the first PUCCH being based on a first PUCCH configuration; scheduling a second transmission of second UCI by the UE on a second PUCCH of a second priority, the second PUCCH being based on a second PUCCH configuration, wherein the second PUCCH of the second priority overlaps in time with the first PUCCH of the first priority; and receiving a multiplexed transmission comprising at least part of the first UCI with the second UCI on a third PUCCH of the second priority, the third PUCCH being based on the second PUCCH configuration, wherein the second priority is higher than the first priority.

In certain embodiments, a plurality of PUCCH resources of the first PUCCH configuration are of the first priority, and a plurality of PUCCH resources of the second PUCCH configuration are of the second priority.

In some embodiments, the second UCI comprises HP HARQ-ACK information, at least one HP scheduling request (SR), or a combination thereof.

In one embodiment, an apparatus comprises a network device. The apparatus further comprises: a processor that: schedules a first transmission of first uplink control information (UCI) by a user equipment (UE) on a first physical uplink control channel (PUCCH) of a first priority, the first PUCCH being based on a first PUCCH configuration; and schedules a second transmission of second UCI by the UE on a second PUCCH of a second priority, the second PUCCH being based on a second PUCCH configuration, wherein the second PUCCH of the second priority overlaps in time with the first PUCCH of the first priority; and a receiver that receives a multiplexed transmission comprising at least part of the first UCI with the second UCI on a third PUCCH of the second priority, the third PUCCH being based on the second PUCCH configuration, wherein the second priority is higher than the first priority.

In certain embodiments, a plurality of PUCCH resources of the first PUCCH configuration are of the first priority, and a plurality of PUCCH resources of the second PUCCH configuration are of the second priority.

In some embodiments, the second UCI comprises HP HARQ-ACK information, at least one HP scheduling request (SR), or a combination thereof.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method performed by a user equipment (UE), the method comprising:

determining a first transmission of first uplink control information (UCI) on a first physical uplink control channel (PUCCH) of a first priority, the first PUCCH being based on a first PUCCH configuration;

determining a second transmission of second UCI on a second PUCCH of a second priority, the second PUCCH being based on a second PUCCH configuration;

in response to determining that the first PUCCH of the first priority overlaps in time with the second PUCCH of the second priority, multiplexing at least part of the first UCI with the second UCI on a third PUCCH of the second priority, the third PUCCH being based on the second PUCCH configuration, wherein the second priority is higher than the first priority; and in response to the third PUCCH overlapping in time with a physical uplink shared channel (PUSCH), multiplexing at least part of the first UCI with the second UCI on the PUSCH, wherein the PUSCH corresponds to a configured grant (CG) PUSCH, and wherein the CG PUSCH comprises CG UCI.

2. A user equipment (UE), comprising:

at least one memory; and at least one processor coupled with the at least one memory and configured to cause the UE to:

determine a first transmission of first uplink control information (UCI) on a first physical uplink control channel (PUCCH) of a first priority, the first PUCCH being based on a first PUCCH configuration;

determine a second transmission of second UCI on a second PUCCH of a second priority, the second PUCCH being based on a second PUCCH configuration;

in response to determining that the first PUCCH of the first priority overlaps in time with the second PUCCH of the second priority, multiplex at least part of the first UCI with the second UCI on a third PUCCH of the second priority, the third PUCCH being based on the second PUCCH configuration, wherein the second priority is higher than the first priority; and in response to the third PUCCH overlapping in time with a physical uplink shared channel (PUSCH), multiplex at least part of the first UCI with the second UCI on the PUSCH, wherein the PUSCH corresponds to a configured grant (CG) PUSCH, and wherein the CG PUSCH comprises CG UCI.

3. The UE of claim 2, wherein the at least one processor is configured to cause the UE to construct a first hybrid automatic repeat request (HARQ) acknowledgement (ACK) (HARQ-ACK) codebook corresponding to the first PUCCH configuration and a second HARQ-ACK codebook corresponding to the second PUCCH configuration, wherein the at least part of first UCI comprises the first HARQ-ACK codebook and the second UCI comprises the second HARQ-ACK codebook.

4. The UE of claim 3, wherein the first HARQ-ACK codebook is low priority (LP) HARQ-ACK information and the second HARQ-ACK codebook is high priority (HP) HARQ-ACK information.

5. The UE of claim 4, wherein the at least one processor is configured to cause the UE to encode the LP HARQ-ACK information separately from encoding the HP HARQ-ACK information.

6. The UE of claim 2, wherein a plurality of PUCCH resources of the first PUCCH configuration are of the first priority, and a plurality of PUCCH resources of the second PUCCH configuration are of the second priority.

7. The UE of claim 2, wherein the second UCI comprises high priority (HP) HARQ-ACK information, at least one HP scheduling request (SR), or a combination thereof.

8. The UE of claim 2, wherein the at least one processor coupled with the at least one memory selects a PUCCH resource set from at least one PUCCH resource set configured in the second PUCCH configuration based on a size of the at least part of the first UCI and a size of the second UCI.

9. The UE of claim 2, wherein the at least one processor is configured to cause the UE to multiplex the at least part of the first UCI with the second UCI into a physical uplink shared channel (PUSCH), when the third PUCCH of the second priority overlaps in time with the PUSCH.

10. The UE of claim 9, wherein the PUSCH corresponds to a configured grant (CG) PUSCH, wherein the CG PUSCH comprises CG UCI.

11. The UE of claim 10, wherein the at least one processor is configured to cause the UE to encode first HARQ-ACK information of the at least part of the first UCI, second HARQ-ACK information of the second UCI, and the CG UCI jointly.

12. The UE of claim 10, wherein the at least one processor is configured to cause the UE to:

encode first HARQ-ACK information of the at least part of the first UCI jointly with the CG UCI and separately encoding second HARQ-ACK information of the second UCI, when the CG PUSCH is of the first priority; and encode the second HARQ-ACK information of the second UCI jointly with the CG UCI and separately encoding the first HARQ-ACK information of the at least part of the first UCI, when the CG PUSCH is of the second priority.

13. The UE of claim 12, wherein the at least one processor is configured to cause the UE to:

determine a first number of coded modulation symbols per layer for the second HARQ-ACK information based on a scaled total number of resource elements to be used for transmission of UCI; and determine a second number of coded modulation symbols per layer for the first HARQ-ACK information and the CG UCI based on the scaled total number of resource elements to be used for transmission of UCI minus the first number of coded modulation symbols per layer for the second HARQ-ACK information, wherein the CG PUSCH is of the first priority.

14. The UE of claim 12, wherein the at least one processor is configured to cause the UE to:

determine a first number of coded modulation symbols per layer for the second HARQ-ACK information and the CG UCI based on a scaled total number of resource elements to be used for transmission of UCI; and determine a second number of coded modulation symbols per layer for the first HARQ-ACK information based on the scaled total number of resource elements to be used for transmission of UCI minus the first number of coded modulation symbols per layer for the second HARQ-ACK information and the CG UCI, wherein the CG PUSCH is of the second priority.

15. A base station, comprising:

at least one memory; and at least one processor coupled with the at least one memory and configured to cause the base station to:

schedule a first transmission of first uplink control information (UCI) by a user equipment (UE) on a first physical uplink control channel (PUCCH) of a first priority, the first PUCCH being based on a first PUCCH configuration;

schedule a second transmission of second UCI by the UE on a second PUCCH of a second priority, the second PUCCH being based on a second PUCCH configuration, wherein the second PUCCH of the second priority overlaps in time with the first PUCCH of the first priority;

receive a first multiplexed transmission comprising at least part of the first UCI with the second UCI on a third PUCCH of the second priority, the third PUCCH being based on the second PUCCH configuration, wherein the second priority is higher than the first priority; and receive a second multiplexed transmission comprising at least part of the first UCI with the second UCI on a physical uplink shared channel (PUSCH), wherein the PUSCH corresponds to a configured grant (CG) PUSCH, and wherein the CG PUSCH comprises CG UCI.

16. A processor for wireless communication, comprising:

at least one controller coupled with at least one memory and configured to cause the processor to:

determine a first transmission of first uplink control information (UCI) on a first physical uplink control channel (PUCCH) of a first priority, the first PUCCH being based on a first PUCCH configuration;

determine a second transmission of second UCI on a second PUCCH of a second priority, the second PUCCH being based on a second PUCCH configuration;

in response to determining that the first PUCCH of the first priority overlaps in time with the second PUCCH of the second priority, multiplex at least part of the first UCI with the second UCI on a third PUCCH of the second priority, the third PUCCH being based on the second PUCCH configuration, wherein the second priority is higher than the first priority; and in response to the third PUCCH overlapping in time with a physical uplink shared channel (PUSCH), multiplex at least part of the first UCI with the second UCI on the PUSCH, wherein the PUSCH corresponds to a configured grant (CG) PUSCH, and wherein the CG PUSCH comprises CG UCI.

17. The processor of claim 16, wherein at least one controller coupled is configured to cause the processor to construct a first hybrid automatic repeat request (HARQ) acknowledgement (ACK) (HARQ-ACK) codebook corresponding to the first PUCCH configuration and a second HARQ-ACK codebook corresponding to the second PUCCH configuration, wherein the at least part of first UCI comprises the first HARQ-ACK codebook and the second UCI comprises the second HARQ-ACK codebook.

18. The processor of claim 17, wherein the first HARQ-ACK codebook is low priority (LP) HARQ-ACK information and the second HARQ-ACK codebook is high priority (HP) HARQ-ACK information.

19. The processor of claim 18, wherein at least one controller coupled is configured to cause the processor to encode the LP HARQ-ACK information separately from encoding the HP HARQ-ACK information.

20. The processor of claim 16, wherein a plurality of PUCCH resources of the first PUCCH configuration are of the first priority, and a plurality of PUCCH resources of the second PUCCH configuration are of the second priority.

* * * * *